(12) United States Patent
Hubert et al.

(10) Patent No.: US 12,242,054 B2
(45) Date of Patent: Mar. 4, 2025

(54) HEAD UP DISPLAY SYSTEM

(71) Applicant: AGC GLASS EUROPE, Louvain-la-neuve (BE)

(72) Inventors: Julie Hubert, Gosselies (BE); Kadosa Hevesi, Gosselies (BE); Patrick Ayoub, Louvain-la-Neuve (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 17/785,371

(22) PCT Filed: Dec. 16, 2020

(86) PCT No.: PCT/EP2020/086578
§ 371 (c)(1),
(2) Date: Jun. 14, 2022

(87) PCT Pub. No.: WO2021/122848
PCT Pub. Date: Jun. 24, 2021

(65) Prior Publication Data
US 2023/0043367 A1  Feb. 9, 2023

(30) Foreign Application Priority Data
Dec. 16, 2019 (EP) ..................... 19216653

(51) Int. Cl.
*G02B 27/01* (2006.01)
*B32B 17/10* (2006.01)

(52) U.S. Cl.
CPC .... *G02B 27/0101* (2013.01); *B32B 17/10036* (2013.01); *G02B 2027/012* (2013.01); *G02B 2027/0194* (2013.01)

(58) Field of Classification Search
CPC .. G02B 5/0833; G02B 27/0101; G02B 1/115; G02B 27/283; G02B 2027/012;
(Continued)

(56) References Cited

U.S. PATENT DOCUMENTS

| | | | |
|---|---|---|---|
| 2007/0082168 A1* | 4/2007 | Hartig | C03C 17/366 428/432 |
| 2010/0214762 A1* | 8/2010 | Nevitt | G02F 1/133605 359/485.02 |
| 2010/0238557 A1* | 9/2010 | Tomoda | G02B 1/111 156/60 |
| 2014/0168760 A1* | 6/2014 | Theios | A01M 29/08 359/359 |
| 2017/0242247 A1 | 8/2017 | Tso et al. | |
| 2019/0064516 A1 | 2/2019 | Wagner et al. | |

FOREIGN PATENT DOCUMENTS

| | | |
|---|---|---|
| CN | 104267498 A | 1/2015 |
| CN | 204166197 U | 2/2015 |

(Continued)

OTHER PUBLICATIONS

International Search Report issued Apr. 7, 2021 in PCT/EP2020/086578, citing references 15-21 therein, 6 pages.

*Primary Examiner* — Hoan C Nguyen
(74) *Attorney, Agent, or Firm* — Oblon, McClelland, Maier & Neustadt, L.L.P.

(57) ABSTRACT

A HUD system including a light source projecting p-polarized light towards a glazing, the glazing includes an outer sheet of glass having a first surface and a second surface, and an inner sheet of glass having a first surface and a second surface, and the second surface of the inner sheet of glass has a first coating, where both sheets are bonded by at least one sheet of interlayer material, and the first coating includes at least one high refractive index layer having a thickness from 50 to 100 nm, and at least one low refractive index layer having a thickness from 70 to 160 nm, and the least one high refractive index layer has at least one of an oxide of Zr, Nb, Sn; a mixed oxide of Ti, Zr, Nb, Si, Sb, Sn, Zn, In; a nitride of Si, Zr; or a mixed nitride of Si, Zr.

22 Claims, 3 Drawing Sheets

(58) Field of Classification Search
CPC .......... G02B 2027/0194; G02B 5/3066; G02B 5/3083; G02B 27/288; G02B 1/10; G02B 27/0018; G02B 5/0875; G02B 1/11; C03C 17/3618; C03C 17/3681; C03C 17/3644; C03C 17/3435; C03C 17/36; C03C 17/3639; C03C 17/3657; C03C 17/3417; C03C 17/3626; C03C 17/366; C03C 2217/734; C03C 27/10; C03C 17/3652; B32B 17/10229; B32B 17/10458; B32B 17/10036; B32B 17/10761; B32B 17/10568; B32B 17/10788; B32B 17/1077; B32B 17/10201; B32B 7/023; B32B 17/10119; B60J 1/00; B60K 35/00
See application file for complete search history.

(56) References Cited

FOREIGN PATENT DOCUMENTS

| | | | | |
|---|---|---|---|---|
| CN | 106082712 | A | 11/2016 | |
| CN | 205899054 | U | 1/2017 | |
| CN | 106483663 | A | 3/2017 | |
| CN | 2061 47178 | U | 5/2017 | |
| CN | 107045203 | A | 8/2017 | |
| EP | 3 187 917 | A2 | 7/2017 | |
| GB | 2324098 | A * | 10/1998 | ......... C03C 17/3417 |
| JP | 2017081775 | A * | 5/2017 | |
| KR | 20200040305 | A * | 4/2020 | |
| WO | WO-2012073540 | A1 * | 6/2012 | ............. G02B 1/115 |
| WO | WO-2015042157 | A1 * | 3/2015 | ........... C03C 17/225 |
| WO | WO 2019/046157 | A1 | 3/2019 | |

* cited by examiner

HEAD UP DISPLAY SYSTEM

FIELD OF THE INVENTION

The present invention relates to head up display system, and to a method to provide for said head up display system.

BACKGROUND OF THE INVENTION

Head up display systems, or HUD systems, are widely used in transportation devices to provide information on the vehicle glazing in the viewing area of a viewer or driver of said transportation device.

A wide variety of HUD systems are known. Commonly, a projection system is combined with a partial mirror (a partial reflector and partial window) as the final optical component for forming a projected image viewable by the user. Simultaneously, the user can view other scenes through the partial mirror. The partial mirror is an important component affecting the usability of the display. Generally, the reflectivity of the partial mirror must be sufficient to reflect light from the projector, but the partial mirror must also be sufficiently transparent to provide adequate viewing through it.

Examples of HUD system are provided in CN104267498A for a head up display system comprising a projection light source, laminated glass and a transparent nanometer film, wherein the transparent nanometer film comprises at least one laminated structure of high reflective index layers/low reflective index layers which sediment sequentially outwards from the surface of an inner glass board; the projection light source is used for generating p-polarized light, the p-polarized light enters the transparent nanometer film, the reflectivity of the p-polarized light from the transparent nanometer film is not lower than 5%, and the incident angle of the p-polarized light ranges from 42 degrees to 72 degrees. Further examples of HUD system are provided in CN206147178U and CN204166197U.

A further example of a HUD is provided in EP3187917A2 for a HUD system comprising a projection light source and a laminated glazing, the laminated glazing comprising an internal glass panel, an external glass panel and an intermediate film sandwiched between the internal glass panel and the external glass panel, wherein the head-up display system further comprises a transparent nanofilm comprising at least two dielectric layers and at least one metallic layer, each metallic layer being located between two dielectric layers; a difference between a refractive index of the intermediate film and a refractive index of the internal glass panel and the external glass panel is no more than 0.1; and the projection light source is used for generating p-polarized light which is incident on a surface of the internal glass panel away from the intermediate film, the light having an angle of incidence of 42 to 72 degrees, such that the transparent nanofilm can reflect part of the incident p-polarized light.

WO2019/046157A1 discloses laminate including: a first ply having a first surface and a second surface, where the first surface is an outer surface of the laminate; a second ply having a third surface facing the second surface and a fourth surface opposite the third surface, where the fourth surface is an inner surface of the laminate; an interlayer between the plies; and an enhanced p-polarized reflective coating positioned over at least a portion of a surface of the plies. When the laminate is contacted with radiation having p-polarized radiation at an angle of 60 relative to normal of the laminate, the laminate exhibits a LTA of at least 70% and a reflectivity of the p-polarized radiation of at least 10%. A display system and method of projecting an image in a heads-up display is also disclosed.

Typical issues with HUD systems is the appearance of a ghost image or a double image. Also an issue is the reflection of elements around the vehicle glazing provided with the projected information, which reflection blurs and attenuates said projected information.

There remains a need for p-polarized light reflective coatings which can withstand thermal treatments and remain useful to reflect a clear and sharp image display on a glazing in a HUD system.

SUMMARY OF THE INVENTION

The present invention provides for a HUD system comprising
 a. a light source projecting light towards a glazing,
 b. said glazing comprising an outer sheet of glass having a first surface and a second surface, and an inner sheet of glass having a first surface and a second surface,
   wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises
   at least one high refractive index layer having a thickness of from 50 to 100 nm
   and
   at least one low refractive index layer having a thickness of from 70 to 160 nm,
 wherein the least one high refractive index layer comprises at least one of
   an oxide of Zr, Nb, Sn;
   a mixed oxide of Ti, Zr, Nb, Si, Sb, Sn, Zn, In;
   a nitride of Si, Zr;
   a mixed nitride of Si, Zr.
Also provided is a method to provide for such a HUD system.

DETAILED DESCRIPTION OF THE INVENTION

Figure 1:
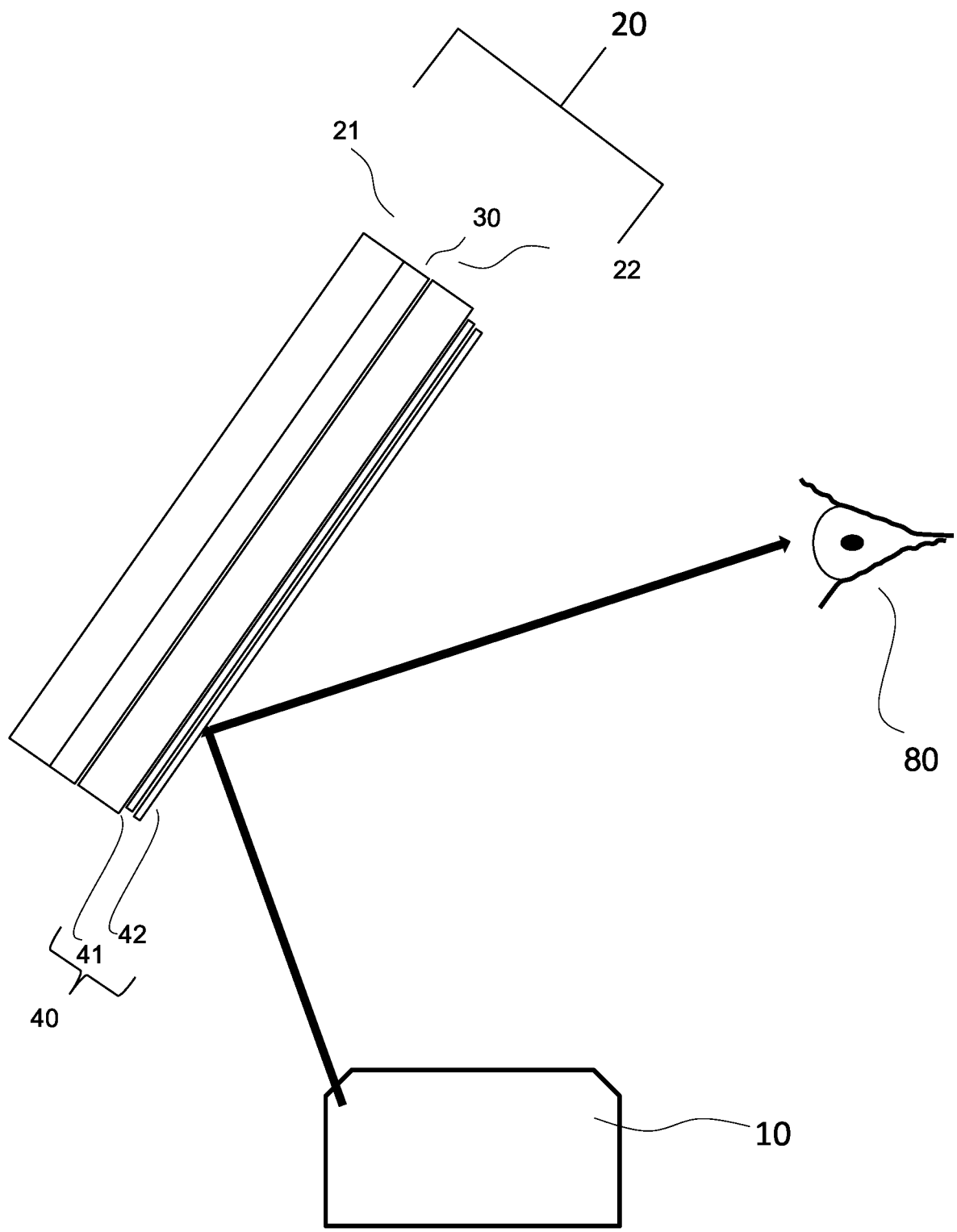
FIG. 1 shows a representative HUD system with a first coating.

FIG. 1 represents an embodiment of the present invention including HUD system (101) comprising a light source (10) projecting p-polarized light towards a glazing (20), the glazing (20) comprising an outer sheet (21) of glass having a first surface and a second surface, and an inner sheet of glass (22) having a first surface and a second surface. The second surface of the inner sheet of glass (21) comprises a first coating (40), the outer sheet of glass and inner sheet of glass bonded by at least one sheet of interlayer material (30) providing contact between the first surface of the inner sheet of glass (22) and the second surface of the outer sheet of glass (21). The first coating (40) comprises at least one high refractive index layer (41) having a thickness from 50 to 100 nm and at least one low refractive index layer (42) having a thickness from 70 to 160 nm. The light is reflected towards an observer (80).

Figure 2:
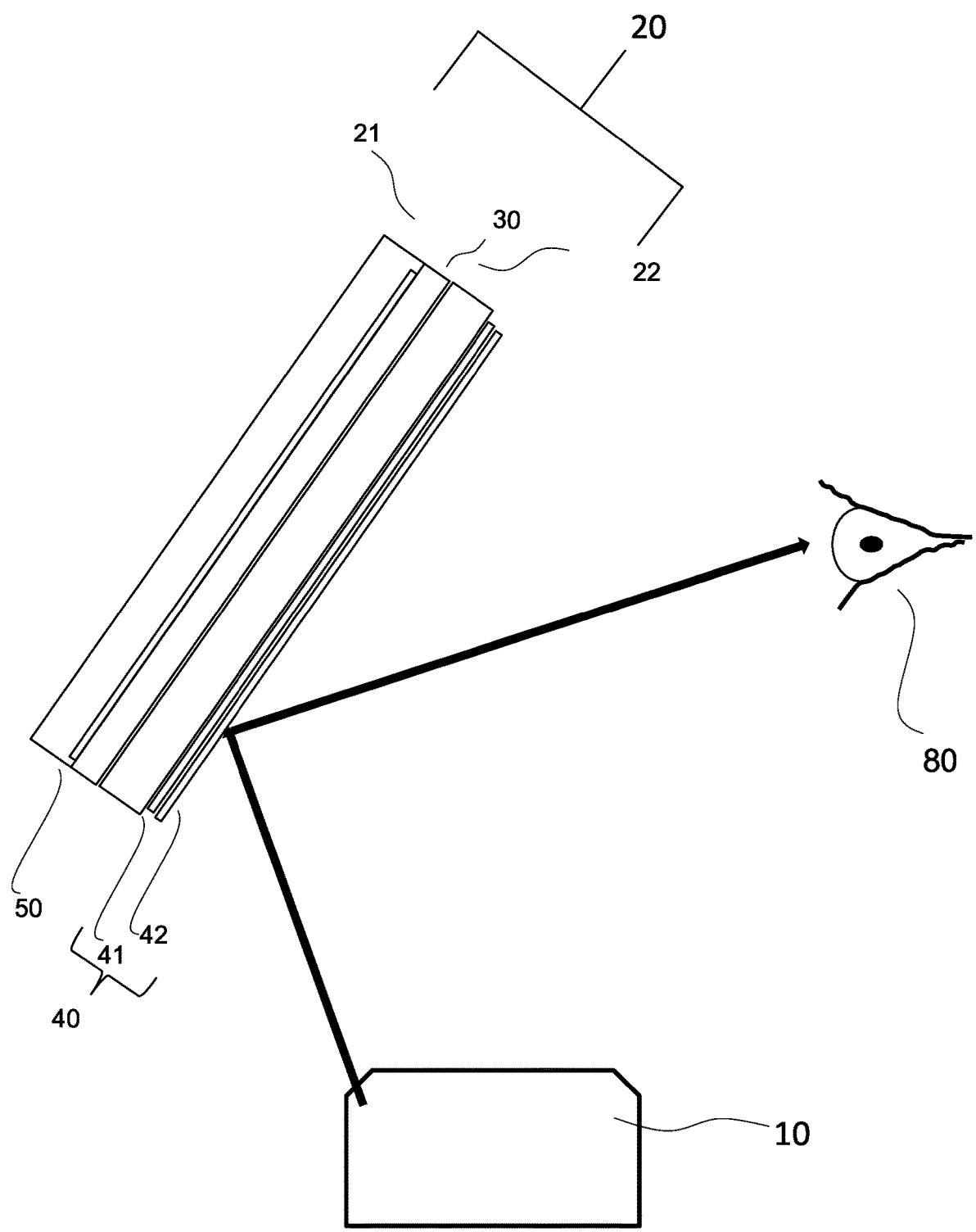
FIG. 2 shows a representative HUD system with a first and a second coating.

FIG. 2 represents another embodiment of the invention including HUD system (101) comprising a light source (10) projecting p-polarized light towards a glazing (20), the glazing (20) comprising an outer sheet (21) of glass having a first surface and a second surface, and an inner sheet of glass (22) having a first surface and a second surface. The second surface of the inner sheet of glass (21) comprises a first coating (40), the outer sheet of glass and inner sheet of glass bonded by at least one sheet of interlayer material (30) providing contact between the first surface of the inner sheet of glass (22) and the second surface of the outer sheet of glass (21). The first coating (40) comprises at least one high refractive index layer (41) having a thickness from 50 to 100 nm and at least one low refractive index layer (42) having a thickness from 70 to 160 nm. The HUD system (201) comprises a second coating (50) located on at least one of the first surface of the inner sheet of glass (22) or the second surface of the outer sheet of glass (21). The light is reflected towards an observer (80).

Figure 3:
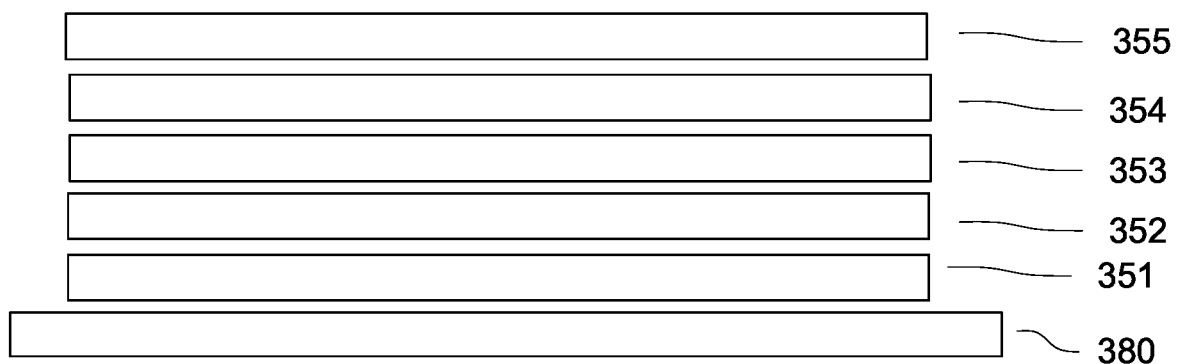
FIG. 3 shows a cross section of a system of layers comprising a second coating.

FIG. 3 represents an expanded cross section of a second coating comprising the following sequential layers on a glass substrate (380); a base dielectric layer (351), a first infra-red reflecting layer (352), a central dielectric layer (353), a second infra-red reflecting layer (354), and a top dielectric layer (355). The substrate may be any of the inner glass sheet or outer glass sheet of the HUD system.

The present invention provides for a HUD system comprising
 a. a light source projecting light towards a glazing,
 b. said glazing comprising an outer sheet of glass having a first surface and a second surface, and an inner sheet of glass having a first surface and a second surface, wherein the second surface of the inner sheet of glass comprises a first coating, both sheets bonded by at least one sheet of interlayer material providing contact between the first surface of the inner sheet of glass and the second surface of the outer sheet of glass,
 characterized in that said first coating comprises
 at least one high refractive index layer having a thickness of from 50 to 100 nm
 and
 at least one low refractive index layer having a thickness of from 70 to 160 nm,
wherein the least one high refractive index layer comprises at least one of
 an oxide of Zr, Nb, Sn;
 a mixed oxide of Ti, Zr, Nb, Si, Sb, Sn, Zn, In;
 a nitride of Si, Zr;
 a mixed nitride of Si, Zr.

A light source typically provides for light projection towards the glazing. The light source may include a polarizer. The light incident on the polarizer can comprise some or all of the visible portion of the electromagnetic spectrum. It can also comprise infrared wavelengths. The reflective polarizer can be configured such that both s- and p-polarized light, at near-normal incidence and at oblique angles, are highly reflected in the infrared region, in which case additional rejection of solar radiation for example can be achieved. Such light sources are typically known in the art and will not be described herein.

In the scope of the present invention, the light source provides for p-polarized light. Such light allows for advantageous reflection of the projected information towards the glazing.

Typically, the projected light is incident to the glazing at an angle of 42 to 72 degrees. An advantage of the present HUD system configured with p-polarized light source, is that no or negligible double image is generated by the external glass surface (S1), if the incidence angle of light is close to the Brewster angle, typically around 56°, as a result of the effective p-polarized light reflectivity of the first coating discussed herein. A further advantage of the present HUD system is the ability to project and reflect various colors in sharp detail.

The glazing comprises an outer sheet of glass having a first surface (S1) and a second surface (S2), and an inner sheet of glass having a first surface (S3) and a second surface (S4). Such glazing is typically laminated. The outer sheet of glass of the glazing is that sheet in contact with the exterior of the vehicle or building. The inner sheet of glass is that sheet in contact with the inner space of the vehicle or building. The two sheets of glass are held in contact with a laminating sheet or interlayer, serving the adhesion and contact between the two sheets of glass. The interlayer provides for the contact between the first surface of the inner sheet of glass (S3) and the second surface of the outer sheet of glass (S2).

The glass may be a glass of soda-lime-silica, alumino-silicate or borosilicate type, and the like. Typically, the glass sheet is float glass, having a thickness of from 0.5 to 12 mm. In transportation applications, the glass may have a thickness ranging of from 1 to 8 mm, while they may also be thinner or thicker in construction applications, like ultrathin glass from 0.5 to 1 mm, or thicker glass, from 8 to 12 mm, in addition to the thickness of from 1 to 8 mm.

The composition of the glazing is not crucial for the purpose of the present invention, provided said glass sheet is appropriate for transportation or architectural applications. The glass may be clear glass, ultra-clear glass or colored glass, comprising one or more component(s)/colorant(s) in an appropriate amount as a function of the effect desired. Colored glass include grey, green or blue float glass. In some circumstances, colored glass may be advantageous to provide for appropriate and desired color of the final glazing.

A particularly suited colored glass may be green glass, as it offers superior aesthetics as observed from the outside of a vehicle. Green glass may for example be a soda-lime glass with iron oxide in the form of $Fe_2O_3$ in amounts ranging of from 0.3 to 1.0 wt %.

The glass sheet may be flat or totally or partially curved to correctly fit with the particular design of the glass support, as the shape requires for the application.

The interlayer typically contains thermoplastic materials, for example, polyvinyl butyral (PVB), ethylene vinyl acetate (EVA), polyurethane (PU), polyethylene terephthalate (PET), polycarbonate, or multiple layers thereof, typically with a total thickness of from 0.3 to 0.9 mm. The interlayer may contain colorants, and thus be a colored interlayer.

In some instances, when the glass is not colored glass, the interlayer may be a colored interlayer. Again, such colored interlayer may provide for superior aesthetics from an outside observer's viewpoint.

The interlayer typically has a uniform thickness throughout its surface between the two sheets of glass. The interlayer is thus typically not considered a "wedge" interlayer. A wedge interlayer may provide for artefacts in the reflected image, and is therefore not essential in the scope of the present invention. Further, such wedge interlayer is typically associated with additional cost for design and production.

In the scope of the present invention, the interlayer is typically free of light absorber or any light interfering polymers. In the scope of the present invention, the interlayer is typically not supporting a multilayer coating.

The second surface of the inner sheet of glass (S4) comprises a first coating. The first coating comprises at least one layer of high refractive index material, and at least one layer of low refractive index material. In the scope of the present invention, such a sequence will be referred to as a "high/low" sequence.

In some embodiments, the first coating may comprise an alternation of layers high and low refractive indices, that is, the first coating may comprise more than one layer of high refractive index material, and/or more than one layer of low refractive index material. In such instances, the "high/low" sequence may occur more than once, that is, the sequence may be repeated at least 2 times. Repeat sequence of up to 3 or 4 or more times may be provided. In some instances, the repeating sequence will be no more than 3 times.

In the scope of the present invention, at least the inner sheet, provided with the first coating is suitable to withstand a thermal tempering process. Such inner sheet may thus be subject to a thermal tempering process.

In the scope of the present invention, a high refractive index is typically ≥1.8, alternatively ≥1.9, alternatively ≥2.0, alternatively ≥2.1, at a wavelength of 550 nm.

In the scope of the present invention, a low refractive index is typically <1.8, alternatively ≤1.7, alternatively ≤1.6, at a wavelength of 550 nm.

In the scope of the present invention, the at least one high refractive index layer of the first coating comprises at least one of
  an oxide of Zr, Nb, Sn;
  a mixed oxide of Ti, Zr, Nb, Si, Sb, Sn, Zn, In;
  a nitride of Si, Zr;
  a mixed nitride of Si, Zr.

In some embodiments of the present invention, the at least one high refractive index layer of the first coating comprises at least one of a mixed titanium zirconium oxide, a mixed titanium silicon oxide, a mixed niobium zirconium oxide, a mixed silicon zirconium nitride, aluminium doped silicon nitride, zirconium oxide, mixed indium tin oxide, mixed zinc aluminium mixed oxide, mixed antimony tin oxide, mixed titanium zinc oxide, mixed zinc tin oxide.

In the specific selection of thickness ranges, such high refractive index materials are selected because they do not undergo major crystallinity modification upon thermal tempering. In such a perspective, titanium oxide is therefore not recommended as high refractive index material when there is only one high refractive index layer of the first coating because it undergoes major crystallinity modification upon thermal tempering.

In some alternative embodiments of the present invention, the at least one high refractive index layer of the first coating comprises at least one of a mixed titanium zirconium oxide, a mixed titanium silicon oxide, a mixed niobium zirconium oxide, a mixed silicon zirconium nitride, aluminium doped silicon nitride, zirconium oxide, mixed zinc tin oxide.

These materials do not jeopardize the quality of the high refractive index layer upon thermal cycles in the thickness ranges as claimed.

Preferred high refractive index materials to provide for maximum polarized light reflection include, in decreasing order of preference, mixed titanium zirconium oxide, mixed silicon zirconium nitride, mixed titanium silicon oxide, aluminium doped silicon nitride and mixed zinc tin oxide.

Preferred material for the high index layer is mixed titanium zirconium oxide, in a ratio Ti/Zr of from 55/45 to 75/25 wt %, preferably in a ratio of 65/35 wt %, optionally in presence of mixed titanium silicon oxide in the a ratio Ti/Si of from 85/15 to 95/5 wt %, preferably in a ratio of 92/8 wt %.

Examples of low refractive index material include silicon oxide, silicon oxynitride, silicon oxycarbide, optionally doped, for example with aluminium, or mixtures, such as mixed oxide of silicon and aluminium, mixed oxide of silicon and zirconium.

Preferred material for the low index layer is silicon oxide, optionally doped with aluminium, or a mixed oxide of silicon and aluminium.

The first coating may thus comprise a first layer of high refractive index material in contact with the glass, and a first layer of low refractive index material above the first layer of high refractive index material. In such embodiments, the thickness of the first layer of high refractive index material, optionally made of one or more sublayers, may range of from 50 to 100 nm, alternatively of from 60 to 80 nm. In such embodiments, the thickness of the first layer of low refractive index material, optionally made of one or more sublayers, may independently range of from 70 to 160 nm, alternatively of from 80 to 120 nm.

These ranges of thicknesses as claimed allow for a first coating having optimal p-polarized light reflection, such that it may be ≥8%, alternatively ≥9%, together with optimal suppression of total reflectance, remaining ≤21%, and which can withstand thermal treatments.

A thickness of the first layer of high refractive index material <50 nm does not allow for optimal p-polarized light reflection. A thickness of the first layer of low refractive index material <70 nm does not allow optimal p-polarized light reflection. A thickness of the first layer of low refractive index material >160 nm does not allow for optimal suppression of total reflectance.

The selection of thickness ranges as herein provided for the first layer of high refractive index material and for the first layer of low refractive index material, combined with the selection of high refractive index materials allow for an optimal p-polarized light reflective coating, which at the same time does not have a high total reflectance, such that reflection from the dashboard does not become an annoyance. Also ensured is the aesthetics in reflection as observed from the outside.

In some embodiments of the present invention, the first coating consists of a first layer of high refractive index material in contact with the glass, and a first layer of low refractive index material above and in contact with the first layer of high refractive index material. In such embodiments, the thickness of the first layer of high refractive index material, optionally made of one or more sublayers, may range of from 50 to 100 nm, alternatively of from 60 to 80 nm. In such embodiments, the thickness of the first layer of low refractive index material, optionally made of one or more sublayers, may independently range of from 70 to 160 nm, alternatively of from 80 to 120 nm.

In some embodiments of the present invention, when the repeating sequence "high/low" is two times, the first coating comprises a first layer of high refractive index material in contact with the glass, and a first layer of low refractive index material above the first layer of high refractive index material, and a second layer of high refractive index material above the first layer of low refractive index material, and a second layer of low refractive index material above the second layer of high refractive index material.

In such embodiments of 2 "high/low" repeating sequences, the first coating may comprise
a. a first layer of high refractive index material having a thickness of from 1 to 15 nm, in contact with the glass, alternatively of from 2 to 11 nm, and
b. a first layer of low refractive index material having a thickness of from 150 to 220 nm, above the first layer of high refractive index material, alternatively of from 152 to 210 nm, alternatively of from 157.7 to 210 nm and
c. a second layer of high refractive index material having a thickness of from 50 to 100 nm above the first layer of low refractive index material, alternatively of from 50 to 90 nm, alternatively of from 55 to 75 nm, and
d. a second layer of low refractive index material having a thickness of from 70 to 160 nm, above the second layer of high refractive index material, alternatively of from 95 to 115 nm.

These ranges of thicknesses combined with one another for the high refractive index layers and low refractive index layers, specifically in the ranges as provided allow for a first coating having optimal p-polarized light reflection, such that it may be ≥8%, alternatively ≥9%, together with optimal suppression of total reflectance, remaining ≤21%, and which can withstand thermal treatments.

The selection of thickness ranges for each layer allows for specific performances in terms of p-polarized light reflection. Such performances can for example not be achieved when the first layer of low refractive index material has a thickness <150 nm, or <152 nm or <157.7 nm.

In specific embodiments of 2 "high/low" repeating sequences, the first coating consists of
a. a first layer of high refractive index material having a thickness of from 1 to 15 nm, in contact with the glass, alternatively of from 2 to 11 nm, and
b. a first layer of low refractive index material having a thickness of from 150 to 220 nm, above and in contact with the first layer of high refractive index material, alternatively of from 152 to 210 nm, alternatively of from 157.7 to 210 nm, and
c. a second layer of high refractive index material having a thickness of from 50 to 100 nm above and in contact with the first layer of low refractive index material, alternatively of from 50 to 90 nm, alternatively of from 55 to 75 nm, and
d. a second layer of low refractive index material having a thickness of from 70 to 160 nm, above and in contact with the second layer of high refractive index material, alternatively of from 95 to 115 nm.

When the repeating sequence "high/low" is three times, the first coating comprises a first layer of high refractive index material in contact with the glass, and a first layer of low refractive index material above the first layer of high refractive index material, and a second layer of high refractive index material above the first layer of low refractive index material, and a second layer of low refractive index material above the second layer of high refractive index material, and a third layer of high refractive index material above the second layer of low refractive index material, and a third layer of low refractive index material above the third layer of high refractive index material.

In such embodiments of 3 "high/low" repeating sequences, the first coating may comprise
a. a first layer of high refractive index material having a thickness of from 1 to 15 nm, in contact with the glass, alternatively of from 4 to 10 nm, and
b. a first layer of low refractive index material having a thickness of from 100 to 160 nm, above the first layer of high refractive index material, alternatively of from 120 to 140 nm, and
c. a second layer of high refractive index material having a thickness of from 1 to 20 nm, above the first layer of low refractive index material, alternatively of from 2 to 8 nm, and
d. a second layer of low refractive index material having a thickness of from 20 to 60 nm, above the second layer of high refractive index material, alternatively of from 40 to 50 nm, and
e. a third layer of high refractive index material having a thickness of from 40 to 100 nm, above the second layer of low refractive index material, alternatively of from 45 to 90 nm, and
f. a third layer of low refractive index material having a thickness of from 80 to 140 nm, above the third layer of high refractive index material, alternatively of from 90 to 130 nm.

These ranges of thicknesses allow for optimal p-polarized light reflection together with optimal suppression of total reflectance for a first coating as claimed, which can withstand thermal treatments.

In other embodiments of 3 "high/low" repeating sequences, the first coating consists of
a. a first layer of high refractive index material having a thickness of from 1 to 15 nm, in contact with the glass, alternatively of from 4 to 10 nm, and
b. a first layer of low refractive index material having a thickness of from 100 to 160 nm, above and in contact with the first layer of high refractive index material, alternatively of from 120 to 140 nm, and
c. a second layer of high refractive index material having a thickness of from 1 to 20 nm, above and in contact with the first layer of low refractive index material, alternatively of from 2 to 8 nm, and
d. a second layer of low refractive index material having a thickness of from 20 to 60 nm, above and in contact with the second layer of high refractive index material, alternatively of from 40 to 50 nm, and
e. a third layer of high refractive index material having a thickness of from 40 to 100 nm, above and in contact with the second layer of low refractive index material, alternatively of from 45 to 90 nm, and
f. a third layer of low refractive index material having a thickness of from 80 to 140 nm, above and in contact with the third layer of high refractive index material, alternatively of from 90 to 130 nm.

In those instances of more than 1 "high/low" repeating sequence, at least one of the high refractive index layer of the first coating comprises at least one of
an oxide of Zr, Nb, Sn;
a mixed oxide of Ti, Zr, Nb, Si, Sb, Sn, Zn, In;
a nitride of Si, Zr;
a mixed nitride of Si, Zr.

When there is more than one high refractive index layer in the first coating, that is, when there is more than 1 "high/low" sequence in the first coating, at least one of the high refractive index layer may comprise at least one of
an oxide of Zr, Nb, Sn;
a mixed oxide of Ti, Zr, Nb, Si, Sb, Sn, Zn, In;
a nitride of Si, Zr;
a mixed nitride of Si, Zr, while a second or more high refractive index layer may independently comprise at least one of
- an oxide of Zr, Nb, Sn, Ti, Bi, Ga, Gd, Hf, Mg, W, Y, optionally doped with Al, B, F, In, Si, Sb, Sn;
- a mixed oxide of Ti, Zr, Nb, Si, Sb, Sn, Zn, In, B;
- a nitride of Si, Zr;
- a mixed nitride of Si, Zr.

Other examples of high refractive index materials for a second or more high refractive index layer may thus include titanium oxide, bismuth oxide, gallium oxide, gadolinium oxide, hafnium oxide, magnesium oxide, tungsten oxide, yttrium oxide, optionally doped, or mixtures of these, mixed oxides of zirconium and boron, mixed oxides of zinc and aluminium. Titanium oxide may be used in a second or more high refractive index layer provided the first high refractive index layer is not titanium oxide. In such a perspective when there is more than one high refractive index layer in the first coating, titanium oxide is thus not recommended as high refractive index material of the first high refractive index layer as it undergoes crystallinity modification upon tempering.

Preferred high refractive index materials to provide for maximum polarized light reflection include, in decreasing order of preference, mixed titanium zirconium oxide mixed silicon zirconium nitride, mixed titanium silicon oxide, aluminium doped silicon nitride and mixed zinc tin oxide.

In the selection of thickness ranges, the high refractive index materials are selected because they do not undergo major crystallinity modification upon thermal tempering. In such a perspective, titanium oxide for all high refractive index layers is therefore not recommended because it undergoes major crystallinity modification upon thermal tempering.

In some embodiments, when there is more than one high refractive index layer in the first coating, that is, when there is more than 1 "high/low" sequence in the first coating, the high refractive index layers may each independently comprise at least one of
- an oxide of Zr, Nb, Sn;
- a mixed oxide of Ti, Zr, Nb, Si, Sb, Sn, Zn, In;
- a nitride of Si, Zr;
- a mixed nitride of Si, Zr.

In some instances, preferred materials for at least one high index layers material is mixed titanium zirconium oxide, in a ratio Ti/Zr of from 55/45 to 75/25 wt %, preferably in ratio of 65/35 wt %, while at least one other high index layers material may be mixed titanium silicon oxide, in a ratio Ti/Si of from 85/15 to 95/5 wt %, preferably in a ratio of 92/8 wt %. Together they may achieve, in the ranges of thicknesses as claimed and in conjunction with the selected low refractive index layers, a first coating with optimal p-polarized light reflection, such that it may be ≥8%, alternatively ≥9%, together with optimal suppression of total reflectance, remaining ≤21%, which can withstand thermal treatments.

In other instances, preferred material for all the high index layers material is mixed titanium zirconium oxide, in a ratio Ti/Zr of from 55/45 to 75/25 wt %, preferably in ratio of 65/35 wt %. It may contribute, in the ranges of thicknesses as claimed and in conjunction with the selected low refractive index layers, a first coating with optimal p-polarized light reflection, such that it may be ≥9%, alternatively ≥10%, together with optimal suppression of total reflectance, remaining ≤21%, which can withstand thermal treatments.

Preferred material for all the low refractive index layers is silicon oxide, optionally doped with aluminium, or a mixed oxide of silicon and aluminium.

In all embodiments, the thicknesses of the different layers may independently vary within the limits as provided, to fine-tune for the technical effect provided by the present invention.

In the scope of the present invention, a second coating comprising n IR reflective functional layer based layer and n+1 dielectric layers, each IR reflective functional layer based layer being located between two dielectric layers may optionally be provided on at least one of the first surface of the inner sheet of glass (S3) or the second surface of the outer sheet of glass (S2).

This second coating is compatible with all previous embodiments described above. Such a second coating does not impair the functioning of the first coating, that is, the first coating is still providing for p-polarized light reflection useful to reflect a clear and sharp image display on a glazing in a HUD system.

In some instances, when at least one of the inner or outer sheet is an ultrathin sheet of clear glass, having a thickness from 0.5 to 1 mm, the presence of the second coating further allows for decreasing the total solar transmission.

In the scope of the present invention, the terms "below", "underneath", "under" indicate the relative position of a layer vis a vis a next layer, within the layer sequence starting from the substrate. In the scope of the present invention, the terms "above", "upper", "on top", "on" indicate the relative position of a layer vis a vis a next layer, within the layer sequence starting from the substrate.

In the scope of the present invention, the relative positions of the layers within the optional second coating do not necessarily imply direct contact. That is, some intermediate layer may be provided between a first and a second layer. In some instances, a layer may actually be composed of several multiple individual layers (or sublayers).

In some instances, the relative position may imply direct contact, and will be specified.

In most instances, the optional second coating does not contain a nitride containing layer in contact with the glass surface.

The IR reflective functional layer may be made of silver, gold, palladium, platinum or alloys thereof. The functional layer may have a thickness of from 2 to 22 nm, alternatively of from 5 to 20 nm, alternatively of from 8 to 18 nm. The thickness range of the functional layer will influence the conductivity, the emissivity, the anti-solar function and the light transmission of the second coating.

The dielectric layers may typically comprise oxides, nitrides, oxynitrides or oxycarbides of Zn, Sn, Ti, Zr, In, Al, Bi, Ta, Mg, Nb, Y, Ga, Sb, Mg, Si and mixtures thereof. These materials may be optionally doped, where examples of dopants include aluminium, zirconium, or mixtures thereof. The dopant or mixture of dopants may be present in an amount up to 15 wt %. Typical examples of dielectric materials include, but are not limited to, silicon based oxides, silicon based nitrides, zinc oxides, tin oxides, mixed zinc-tin oxides, silicon nitrides, silicon oxynitrides, titanium oxides, aluminum oxides, zirconium oxides, niobium oxides, aluminum nitrides, bismuth oxides, mixed silicon-zirconium nitrides, and mixtures of at least two thereof, such as for example titanium-zirconium oxide.

The coating may comprise a seed layer underneath at least one functional layer, and/or the coating may comprise a barrier layer on at least one functional layer. A given functional layer may be provided with either a seed layer, or a barrier layer or both. A first functional layer may be provided with either one or both of seed and barrier layers, and a second functional layer may be provided with either one or both of seed and barrier layers and further so. These constructions are not mutually exclusive. The seed and/or barrier layers may have a thickness of from 0.1 to 35 nm, alternatively 0.5 to 25 nm, alternatively 0.5 to 15 nm, alternatively 0.5 to 10 nm.

The coating may also comprise a thin layer of sacrificial material having a thickness <15 nm, alternatively <9 nm, provided above and in contact with at least one functional layer, and which may be selected from the group comprising titanium, zinc, nickel, aluminium chrome and mixtures thereof.

The coating may optionally comprise a topcoat or top layer, as last layer, intended to protect the stack below it, from damage. Such top coat include oxides of Ti, Zr, Si, Al, or mixtures thereof; nitrides of Si, Al, or mixtures thereof; carbon-based layers (such as graphite or diamond-like carbon).

Examples of optional second coating include those coatings comprising:
- an infrared (IR) reflecting layer contacting and sandwiched between first and second layers, said second layer comprising NiCrOx; and
- wherein at least said second layer comprising NiCrOx is oxidation graded so that a first portion of said second layer close to said infrared (IR) reflecting layer is less oxidized than a second portion of said second layer that is further from said infrared (IR) reflecting layer.

Examples of optional second coating also include those coatings comprising: a dielectric layer; a first layer comprising zinc oxide located over the dielectric layer; an infrared (IR) reflecting layer comprising silver located over and contacting the first layer comprising zinc oxide; a layer comprising an oxide of NiCr located over and contacting the IR reflecting layer; a second layer comprising zinc oxide located over and contacting the layer comprising the oxide of NiCr; and another dielectric layer located over the second layer comprising zinc oxide;

or those comprising: a first dielectric layer; a first infrared (IR) reflecting layer comprising silver located over at least the first dielectric layer; a first layer comprising zinc oxide located over at least the first IR reflecting layer and the first dielectric layer; a second IR reflecting layer comprising silver located over and contacting the first layer comprising zinc oxide; a layer comprising an oxide of NiCr located over and contacting the second IR reflecting layer; a second layer comprising zinc oxide located over and contacting the layer comprising the oxide of NiCr; and another dielectric layer located over at least the second layer; comprising zinc oxide.

Further suitable examples of optional second coating include a solar control coating comprising
- a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
- a first infra-red reflecting layer, such as silver, gold, platinum, or mixtures thereof,
- a first barrier layer,
- a central dielectric layer comprising at least a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which the ratio Y/Zn in the base dielectric upper layer is between 0.02 and 0.5 by weight and in which Y is one or more of the materials selected from the group comprising Sn, Al, Ga, In, Zr, Sb, Bi, Mg, Nb, Ta and Ti,
- a second infra-red reflecting layer, such as silver, gold, platinum, or mixtures thereof,
- a second barrier layer,
- a top dielectric layer.

A still further example of suitable optional second coating includes a solar control coating comprising
- a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
- a first infra-red reflecting layer, such as silver, gold, platinum, or mixtures thereof,
- a first barrier layer,
- a second dielectric layer comprising at least a second dielectric lower layer and a second dielectric upper layer which is of a different composition to that of the second dielectric lower layer, the second dielectric lower layer being in direct contact with the first barrier layer and the second dielectric upper layer; the second dielectric upper layer comprising either one of zinc oxide or a mixed oxide of Zn and at least one additional material Y, in which the ratio Y/Zn in the second dielectric upper layer is between 0.02 and 0.5 by weight and in which Y is one or more of the materials selected from the group comprising Sn, Al, Ga, In, Zr, Sb, Bi, Mg, Nb, Ta and Ti,
- a second infra-red reflecting layer, such as silver, gold, platinum, or mixtures thereof,
- a second barrier layer,
- a third dielectric layer comprising at least a third dielectric lower layer and a third dielectric upper layer which is of a different composition to that of the third dielectric lower layer, the third dielectric lower layer being in direct contact with the second barrier layer and the third dielectric upper layer; the third dielectric upper layer comprising either one of zinc oxide or a mixed oxide of Zn and at least one additional material Y, in which the ratio Y/Zn in the third dielectric upper layer is between 0.02 and 0.5 by weight and in which Y is one or more of the materials selected from the group comprising Sn, Al, Ga, In, Zr, Sb, Bi, Mg, Nb, Ta and Ti,
- a third infra-red reflecting layer, such as silver, gold, platinum, or mixtures thereof,
- a third barrier layer,
- a top dielectric layer.

In such stacks, the base dielectric upper layer may be in direct contact with the first infra-red reflecting layer. The central dielectric upper layer may be in direct contact with the second infra-red reflecting layer. The upper layers of both the base dielectric layer and the central, first and second dielectric layer may independently have a geometrical thickness within the range of about 3 to 20 nm. One or both of the additional materials X and Y may be Sn and/or Al. The proportion of Zn in the mixed oxide that forms the base dielectric upper layer and/or that which forms the central dielectric upper layer may be such that ratio X/Zn and/or the ratio Y/Zn is between about 0.03 and 0.3 by weight. The first and/or second and/or third barrier layer may be a layer comprising Ti and/or comprising an oxide of Ti, and they may each independently have a geometrical thickness of from 0.5 to 7 nm. The base dielectric upper layer and/or the central and/or the second and/or third dielectric upper layer may independently have a geometrical thickness <20 nm, alternatively <15 nm, alternatively <13 nm, alternatively <11 nm, and >3 nm, alternatively >5 nm, alternatively >10 nm. The infra-red reflecting layers may each independently have a thickness of from 2 to 22 nm, alternatively of from 5 to 20 nm, alternatively of from 8 to 18 nm. The top dielectric layer may comprise at least one layer which comprises a mixed oxide of Zn and at least one additional material W, in which the ratio W/Zn in that layer is between 0.02 and 2.0 by weight and in which W is one or more of the materials selected from the group comprising Sn, Al, Ga, In, Zr, Sb, Bi, Mg, Nb, Ta and Ti.

A specific example of such a solar control coating is provided in the table below, in which ZnSnOx is a mixed oxide containing Zn and Sn deposited by reactively sputtering a target which is an alloy or mixture of Zn and Sn, in the presence of oxygen. Alternatively, a mixed oxide layer may be formed by sputtering a target which is a mixture of zinc oxide and an oxide of an additional material, particularly in an argon gas or argon rich oxygen containing atmosphere.

The Ti barriers are deposited by sputtering a Ti target which is in a pure argon or in an argon rich oxygen containing atmosphere to deposit a barrier that is not fully oxidized. The oxidation state in each of the base, central and top ZnSnOx dielectric layers need not necessarily be the same. Similarly, the oxidation state in each of the Ti barriers need not be the same. Each overlying barrier protects its underlying silver layer from oxidation during sputter deposition of its overlying ZnSnOx oxide layer. Whilst further oxidation of these barriers layers may occur during deposition of their overlying oxide layers a portion of these barriers may remain in metallic form or in the form of an oxide that is not fully oxidized to provide a barrier for and during subsequent heat treatment of the glazing panel.

TABLE 1

| (ratio of Sn/Zn by weight) | Geometrical thickness |
|---|---|
| Glass substrate | 2 mm |
| Base dielectric layer comprising: | |
| lower layer of ZnSnOx (0.7) | 20 nm |
| upper layer of ZnSnOx (0.17) | 10 nm |
| Ag | 10 nm |
| Ti overlying barrier | 4 nm |
| Central dielectric layer comprising | |
| central lower layer of ZnSnOx (0.7) | 65 nm |
| upper layer of ZnSnOx (0.17) | 10 nm |
| Ag | 10 nm |
| Ti overlying barrier | 4 nm |

TABLE 1-continued

| (ratio of Sn/Zn by weight) | Geometrical thickness |
|---|---|
| Top dielectric layer comprising: | |
| lower layer of ZnSnOx (0.17) | 8 nm |
| upper layer of ZnSnOx (0.7) | 14 nm |
| Protective overcoat of Ti | 3 nm |

An optimal solar control coating suitable to the present invention may comprise the following sequential layers:
a base dielectric layer comprising a base dielectric lower layer and a base dielectric upper layer which is of a different composition to that of the base dielectric lower layer,
the base dielectric lower layer comprising a mixed oxide of Zn and Sn having a ratio Sn/Zn ranging from 0.5 to 2 by weight,
the base dielectric upper layer comprising a mixed oxide of Zn and Sn having a ratio Sn/Zn ranging from 0.02 to 0.5 by weight
a first infra-red reflecting layer comprising metallic silver
a first barrier layer
a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2
the central dielectric upper layer comprising a mixed oxide of Zn and Sn having a ratio Sn/Zn ranging from 0.02 to 0.5 by weight
a second infra-red reflecting layer comprising metallic silver
a second barrier layer
a top dielectric layer.

Such optimal solar control coating suitable to the present invention may comprise the following sequential layers and geometrical thicknesses:
a base dielectric layer comprising a base dielectric lower layer and a base dielectric upper layer which is of a different composition to that of the base dielectric lower layer,
the base dielectric lower layer comprising a mixed oxide of Zn and Sn having a ratio Sn/Zn ranging from 0.5 to 2 by weight, having a geometrical thickness of from 15-25 nm,
the base dielectric upper layer comprising a mixed oxide of Zn and Sn having a ratio Sn/Zn ranging from 0.02 to 0.5 by weight, having a geometrical thickness of from 5-15 nm,
a first infra-red reflecting layer comprising metallic silver, having a geometrical thickness of from 8-16 nm,
a first barrier layer, having a geometrical thickness of from 3-8 nm,
a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2, having a geometrical thickness of from 58-74 nm,
the central dielectric upper layer comprising a mixed oxide of Zn and Sn having a ratio Sn/Zn ranging from 0.02 to 0.5 by weight, having a geometrical thickness of from 5-15 nm, a second infra-red reflecting layer comprising metallic silver, having a geometrical thickness of from 8-16 nm,
a second barrier layer, having a geometrical thickness of from 3-8 nm,
a top dielectric layer, having a geometrical thickness of from 14-22 nm,
an optional topcoat having a geometrical thickness of from 2-8 nm.

A further optimal solar control coating suitable to the present invention may comprise the following sequential layers:
a base dielectric layer comprising a base dielectric lower layer and a base dielectric upper layer which is of a different composition to that of the base dielectric lower layer,
the base dielectric lower layer comprising a mixed oxide of Zn and Sn having a ratio Sn/Zn ranging from 0.5 to 2 by weight
the base dielectric upper layer comprising a mixed oxide of Zn and Sn having a ratio Sn/Zn ranging from 0.02 to 0.5 by weight
a first infra-red reflecting layer comprising metallic silver
a first barrier layer
a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2
the second dielectric upper layer comprising a mixed oxide of Zn and Sn having a ratio Sn/Zn ranging from 0.02 to 0.5 by weight
a second infra-red reflecting layer comprising metallic silver
a second barrier layer
a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2
the third dielectric upper layer comprising a mixed oxide of Zn and Sn having a ratio Sn/Zn ranging from 0.02 to 0.5 by weight
a third infra-red reflecting layer comprising metallic silver
a third barrier layer
a top dielectric layer.

Such further optimal solar control coating suitable to the present invention may comprise the following sequential layers and geometrical thicknesses:
a base dielectric layer comprising a base dielectric lower layer and a base dielectric upper layer which is of a different composition to that of the base dielectric lower layer,
the base dielectric lower layer comprising a mixed oxide of Zn and Sn having a ratio Sn/Zn ranging from 0.5 to 2 by weight, having a geometrical thickness of from 25-35 nm,
the base dielectric upper layer comprising a mixed oxide of Zn and Sn having a ratio Sn/Zn ranging from 0.02 to 0.5 by weight, having a geometrical thickness of from 5-15 nm,
a first infra-red reflecting layer comprising metallic silver, having a geometrical thickness of from 10-16 nm,
a first barrier layer, having a geometrical thickness of from 3-8 nm,
a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2, having a geometrical thickness of from 58-74 nm,
the second dielectric upper layer comprising a mixed oxide of Zn and Sn having a ratio Sn/Zn ranging from 0.02 to 0.5 by weight, having a geometrical thickness of from 5-15 nm,
a second infra-red reflecting layer comprising metallic silver, having a geometrical thickness of from 10-17 nm,
a second barrier layer, having a geometrical thickness of from 3-8 nm,
a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2, having a geometrical thickness of from 50-75 nm,
the third dielectric upper layer comprising a mixed oxide of Zn and Sn having a ratio Sn/Zn ranging from 0.02 to 0.5 by weight, having a geometrical thickness of from 5-15 nm,
a third infra-red reflecting layer comprising metallic silver, having a geometrical thickness of from 10-16 nm,
a third barrier layer, having a geometrical thickness of from 3-8 nm,
a top dielectric layer, having a geometrical thickness of from 20-40 nm,
an optional topcoat having a geometrical thickness of from 2-8 nm.

In some embodiments, the HUD system comprises
a. A light source projecting p-polarized light towards a glazing,
b. said glazing comprising an outer sheet of glass having a first surface and a second surface, and an inner sheet of glass having a first surface and a second surface,
wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises
at least one high refractive index layer having a thickness of from 50 to 100 nm and
at least one low refractive index layer having a thickness of from 70 to 160 nm, wherein the least one high refractive index layer comprises at least one of
an oxide of Zr, Nb, Sn;
a mixed oxide of Ti, Zr, Nb, Si, Sb, Sn, Zn, In;
a nitride of Si, Zr;
a mixed nitride of Si, Zr,
and
c. at least one of the first surface of the inner sheet of glass or the second surface of the outer sheet of glass comprises a second coating comprising the following sequential layers:
a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti, a first infra-red reflecting layer, such as silver, gold, platinum, or mixtures thereof, a first barrier layer, a central dielectric layer comprising at least a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which the ratio Y/Zn in the base dielectric upper layer is between 0.02 and 0.5 by weight and in which Y is one or more of the materials selected from the group comprising Sn, Al, Ga, In, Zr, Sb, Bi, Mg, Nb, Ta and Ti, a second infra-red reflecting layer, such as silver, gold, platinum, or mixtures thereof, a second barrier layer, a top dielectric layer.

In other embodiments, the HUD system comprises
a. A light source projecting p-polarized light towards a glazing,
b. said glazing comprising an outer sheet of glass having a first surface and a second surface, and an inner sheet of glass having a first surface and a second surface, wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises
　　at least one high refractive index layer having a thickness of from 50 to 100 nm
　　and
　　at least one low refractive index layer having a thickness of from 70 to 160 nm,
wherein the least one high refractive index layer comprises at least one of
　　an oxide of Zr, Nb, Sn;
　　a mixed oxide of Ti, Zr, Nb, Si, Sb, Sn, Zn, In;
　　a nitride of Si, Zr;
　　a mixed nitride of Si, Zr,
　　and
c. at least one of the first surface of the inner sheet of glass or the second surface of the outer sheet of glass comprises a second coating comprising the following sequential layers:
a base dielectric layer comprising at least a base dielectric lower layer and a base dielectric upper layer which is of a different composition to that of the base dielectric lower layer, the base dielectric upper layer comprising either one of zinc oxide or a mixed oxide of Zn and at least one additional material X, in which the ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti, a first infra-red reflecting layer, such as silver, gold, platinum, or mixtures thereof, a first barrier layer, a second dielectric layer comprising at least a second dielectric lower layer and a second dielectric upper layer which is of a different composition to that of the second dielectric lower layer, the second dielectric lower layer being in direct contact with the first barrier layer and the second dielectric upper layer; the second dielectric upper layer comprising either one of zinc oxide or a mixed oxide of Zn and at least one additional material Y, in which the ratio Y/Zn in the second dielectric upper layer is between 0.02 and 0.5 by weight and in which Y is one or more of the materials selected from the group comprising Sn, Al, Ga, In, Zr, Sb, Bi, Mg, Nb, Ta and Ti, a second infra-red reflecting layer, such as silver, gold, platinum, or mixtures thereof, a second barrier layer, a third dielectric layer comprising at least a third dielectric lower layer and a third dielectric upper layer which is of a different composition to that of the third dielectric lower layer, the third dielectric lower layer being in direct contact with the second barrier layer and the third dielectric upper layer; the third dielectric upper layer comprising either one of zinc oxide or a mixed oxide of Zn and at least one additional material Y, in which the ratio Y/Zn in the third dielectric upper layer is between 0.02 and 0.5 by weight and in which Y is one or more of the materials selected from the group comprising Sn, Al, Ga, In, Zr, Sb, Bi, Mg, Nb, Ta and Ti, a third infra-red reflecting layer, such as silver, gold, platinum, or mixtures thereof, a third barrier layer, a top dielectric layer.

In yet other embodiments, the HUD system comprises
a. A light source projecting p-polarized light towards a glazing,
b. said glazing comprising an outer sheet of glass having a first surface and a second surface, and an inner sheet of glass having a first surface and a second surface, wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises
　　at least one high refractive index layer having a thickness of from 50 to 100 nm
　　and
　　at least one low refractive index layer having a thickness of from 70 to 160 nm,
wherein the least one high refractive index layer comprises at least one of
　　an oxide of Zr, Nb, Sn;
　　a mixed oxide of Ti, Zr, Nb, Si, Sb, Sn, Zn, In;
　　a nitride of Si, Zr;
　　a mixed nitride of Si, Zr,
　　and
c. at least one of the first surface of the inner sheet of glass or the second surface of the outer sheet of glass comprises a second coating comprising the following sequential layers:
a base dielectric layer comprising a base dielectric lower layer and a base dielectric upper layer which is of a different composition to that of the base dielectric lower layer,
the base dielectric lower layer comprising a mixed oxide of Zn and Sn having a ratio Sn/Zn ranging from 0.5 to 2 by weight the base dielectric upper layer comprising a mixed oxide of Zn and Sn having a ratio Sn/Zn ranging from 0.02 to 0.5 by weight a first infra-red reflecting layer comprising metallic silver a first barrier layer a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2 the central dielectric upper layer comprising a mixed oxide of Zn and Sn having a ratio Sn/Zn ranging from 0.02 to 0.5 by weight a second infra-red reflecting layer comprising metallic silver a second barrier layer a top dielectric layer.

In yet further embodiments, the HUD system comprises a. A light source projecting p-polarized light towards a glazing, b. said glazing comprising an outer sheet of glass having a first surface and a second surface, and an inner sheet of glass having a first surface and a second surface, wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises at least one high refractive index layer having a thickness of from 50 to 100 nm and at least one low refractive index layer having a thickness of from 70 to 160 nm, wherein the least one high refractive index layer comprises at least one of an oxide of Zr, Nb, Sn;

a mixed oxide of Ti, Zr, Nb, Si, Sb, Sn, Zn, In;

a nitride of Si, Zr;

a mixed nitride of Si, Zr, and c. at least one of the first surface of the inner sheet of glass or the second surface of the outer sheet of glass comprises a second coating comprising the following sequential layers:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight the base dielectric upper layer comprising a mixed oxide of Zn and Sn having a ratio Sn/Zn ranging from 0.02 to 0.5 by weight a first infra-red reflecting layer comprising metallic silver a first barrier layer a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2 the second dielectric upper layer comprising a mixed oxide of Zn and Sn having a ratio Sn/Zn ranging from 0.02 to 0.5 by weight a second infra-red reflecting layer comprising metallic silver a second barrier layer a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2 the third dielectric upper layer comprising a mixed oxide of Zn and Sn having a ratio Sn/Zn ranging from 0.02 to 0.5 by weight a third infra-red reflecting layer comprising metallic silver a third barrier layer a top dielectric layer.

In yet further embodiments, the HUD system comprises a. A light source projecting p-polarized light towards a glazing, b. said glazing comprising an outer sheet of glass having a first surface and a second surface, and an inner sheet of glass having a first surface and a second surface, wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises at least one high refractive index layer having a thickness of from 50 to 100 nm and at least one low refractive index layer having a thickness of from 70 to 160 nm, wherein the least one high refractive index layer comprises at least one of an oxide of Zr, Nb, Sn;

a mixed oxide of Ti, Zr, Nb, Si, Sb, Sn, Zn, In;

a nitride of Si, Zr;

a mixed nitride of Si, Zr, and c. at least one of the first surface of the inner sheet of glass or the second surface of the outer sheet of glass comprises a second coating comprising the following sequential layers:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight, having a geometrical thickness of from 15-25 nm, the base dielectric upper layer comprising a mixed oxide of Zn and Sn having a ratio Sn/Zn ranging from 0.02 to 0.5 by weight, having a geometrical thickness of from 5-15 nm, a first infra-red reflecting layer comprising metallic silver, having a geometrical thickness of from 8-16 nm, a first barrier layer, having a geometrical thickness of from 3-8 nm, a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2, having a geometrical thickness of from 58-74 nm, the central dielectric upper layer comprising a mixed oxide of Zn and Sn having a ratio Sn/Zn ranging from 0.02 to 0.5 by weight, having a geometrical thickness of from 5-15 nm, a second infra-red reflecting layer comprising metallic silver, having a geometrical thickness of from 8-16 nm, a second barrier layer, having a geometrical thickness of from 3-8 nm, a top dielectric layer, having a geometrical thickness of from 14-22 nm, an optional topcoat having a geometrical thickness of from 2-8 nm In yet further embodiments, the HUD system comprises a. A light source projecting p-polarized light towards a glazing, b. said glazing comprising an outer sheet of glass having a first surface and a second surface, and an inner sheet of glass having a first surface and a second surface, wherein the second surface of the inner sheet of glass comprises a first coating, both sheets bonded by at least one sheet of interlayer material providing contact between the first surface of the inner sheet of glass (S3) and the second surface of the outer sheet of glass (S2), characterized in that said first coating comprises at least one high refractive index layer having a thickness of from 50 to 100 nm and at least one low refractive index layer having a thickness of from 70 to 160 nm, wherein the least one high refractive index layer comprises at least one of an oxide of Zr, Nb, Sn;

a mixed oxide of Ti, Zr, Nb, Si, Sb, Sn, Zn, In;

a nitride of Si, Zr;

a mixed nitride of Si, Zr, and c. at least one of the first surface of the inner sheet of glass or the second surface of the outer sheet of glass comprises a second coating comprising the following sequential layers:

a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight, having a geometrical thickness of from 25-35 nm, the base dielectric upper layer comprising a mixed oxide of Zn and Sn having a ratio Sn/Zn ranging from 0.02 to 0.5 by weight, having a geometrical thickness of from 5-15 nm, a first infra-red reflecting layer comprising metallic silver, having a geometrical thickness of from 10-16 nm, a first barrier layer, having a geometrical thickness of from 3-8 nm, a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2, having a geometrical thickness of from 58-74 nm, the second dielectric upper layer comprising a mixed oxide of Zn and Sn having a ratio Sn/Zn ranging from 0.02 to 0.5 by weight, having a geometrical thickness of from 5-15 nm, a second infra-red reflecting layer comprising metallic silver, having a geometrical thickness of from 10-17 nm, a second barrier layer, having a geometrical thickness of from 3-8 nm, a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2, having a geometrical thickness of from 50-75 nm, the third dielectric upper layer comprising a mixed oxide of Zn and Sn having a ratio Sn/Zn ranging from 0.02 to 0.5 by weight, having a geometrical thickness of from 5-15 nm, a third infra-red reflecting layer comprising metallic silver, having a geometrical thickness of from 10-16 nm, a third barrier layer, having a geometrical thickness of from 3-8 nm, a top dielectric layer, having a geometrical thickness of from 20-40 nm, an optional topcoat having a geometrical thickness of from 2-8 nm.

Variations may be brought to the first coating according to the present invention, which may comprise a first layer of high refractive index material in contact with the glass, and a first layer of low refractive index material above the first layer of high refractive index material, and a second layer of high refractive index material above the first layer of low refractive index material, and a second layer of low refractive index material above the second layer of high refractive index material.

In all above embodiments, the second coating may be positioned on the first surface of the inner sheet of glass (S3) or on the second surface of the outer sheet of glass (S2).

A method to provide for the present HUD system is also disclosed, comprising the steps of:

a. Providing for a glazing by assembling a first or outer sheet of glass, for at least one sheet of interlayer material, and for a second or inner sheet of glass comprising a first coating on its second surface comprising at least one high refractive index layer having a thickness of from 50 to 100 nm and at least one low refractive index layer having a thickness of from 70 to 160 nm, wherein the least one high refractive index layer comprises at least one of an oxide of Zr, Nb, Sn;

a mixed oxide of Ti, Zr, Nb, Si, Sb, Sn, Zn, In;

a nitride of Si, Zr;

a mixed nitride of Si, Zr, wherein the interlayer provides contact between the first surface of the inner sheet of glass (S3) and the second surface of the outer sheet of glass (S2)

b. Providing for a light source capable of projecting p-polarized light c. Arranging said light source to project said p-polarized light towards said glazing at an incidence angle of 42 to 72°.

The glazing is typically provided by first depositing the first and second coatings to the respective surfaces of glass.

The deposition methods of the first and of the second coating on the respective surfaces of glass, include CVD, PECVD, PVD, magnetron sputtering, wet coating, etc. Different layers of the respective coatings may be deposited using different techniques.

In some embodiments, the at least one low refractive index layer of the first coating may be deposited on the second sheet of glass by a PECVD method, such as hollow cathode method. This method provides for the added benefit of reduced cost and high deposition rate.

In the scope of the present invention, the inner sheet of glass provided with the first coating may be subjected to a thermal treatment, given said first coating is able to withstand such thermal treatment. In some instances, the inner sheet of glass provided with the first coating is subjected to a thermal treatment.

The step of assembling the 2 sheets of glass and the at least one interlayer may be a lamination step for flat glass, or may be a bending step for curved laminated glass, which bending step includes the steps of first bending the sheets of glass and second, laminating said bent sheets of glass.

In some case, it may be useful to mechanically reinforce the outer glass sheet by a thermal treatment to improve its resistance to mechanical constraints. It may also be necessary to bend the vehicle glazing at high temperature for specific applications.

The thermal treatments comprise heating the glazing to a temperature of at least 560° C. in air, for example between 560° C. and 700° C., in particular around 640° C. to 670° C., during around 3, 4, 6, 8, 10, 12 or even 15 minutes according to the heat-treatment type and the thickness of the glazing. The treatment may comprise a rapid cooling step after the heating step, to introduce a stress difference between the surfaces and the core of the glass so that in case of impact, the so-called tempered glass sheet will break safely in small pieces. If the cooling step is less strong, the glass will then simply be heat-strengthened and in any case offer a better mechanical resistance.

The present glazing may be useful in transportation applications or architectural applications, where projection of images or light from a p-polarized light source may be used. Architectural applications include displays, windows, doors, partitions, shower panels, and the like. In such architectural applications, the projection of a sharp image may be useful for displaying room or building information, or the like.

Transportation applications include those vehicles for transportation on road, in air, in and on water, in particular cars, busses, trains, ships, aircraft, spacecraft, space stations and other motor vehicles.

The present glazing may thus be a windshield, rear window, side windows, sun roof, panoramic roof or any other window useful for a car, or any glazing for any other transportation device, where the projection of a sharp image may be useful. The information projected and reflected may include any traffic information, such as directions or traffic density; or any vehicle status information, such as speed, temperature, or the like. The wide field of view and the homogeneous coverage of the surface by the first coating and the optional second coating, which both are able to withstand heat treatments, allow for different angles of view and thus are adaptable for taller and smaller viewers/drivers.

In some instances, the vehicle glazing may serve as a heatable vehicle glazing. Such heatable vehicle glazing includes heatable windshield.

In some embodiments, a second light source may be present in the HUD system and provide for a secondary image or information. The second light source may not be polarized or may be p-polarized or s-polarized, but would provide for an image the same or different from the first light source. In some instances, the image or information is different between the first and second light source. In some instances, augmented reality information may be projected by at least one of the light source, thanks to the wide field of view and/or field of projection.

In some specific circumstances, the first coating may be decoated over at least one specific surface, such that the present invention may be compatible for use in advanced driver-assistance systems (ADAS).

When a second light source is present, the interlayer may be a wedge interlayer.

In the scope of the present invention, the presence of the first coating on a vehicle glazing allows for optimal light refection of the p-polarized light. The projected and reflected image will typically be sharp and clear, defined by a sharp contour and surface. Said surface is typically increased in case of blurred image due to the poor quality of the p-polarized light reflection of the glazing. The difference between a sharp and a blurred image contour is minimal, when the reflection property of the glazing is optimal.

The choice of materials for the first coating is critical to combine optical properties with heat and wear resistance, since the processing of such glazings typically involves bending and/or tempering coated glass at temperatures typically between 600 and 700° C. Further, the final utilization conditions involve that the coating is on the external surface of the glazing exposed to the interior of the vehicle or building, which implies exposure to various kind of cleaning agents, humidity, pollution and mechanical wear. The present glazing in a HUD system allows for proper functioning of said HUD system, with the first coating having a reflectivity of p-polarized light is >4.0%; alternatively >6.0%, alternatively >7.0%, alternatively >9.0%, alternatively >10.0%, at an incident angle of the p-polarized light of from 42 to 72°, alternatively at an angle of 55°.

The present invention also provides for the use of a sheet of glass comprising a first coating on one of its surface, said coating comprising
- at least one high refractive index layer having a thickness of from 50 to 100 nm
and
- at least one low refractive index layer having a thickness of from 70 to 160 nm, wherein the least one high refractive index layer comprises at least one of
- an oxide of Zr, Nb, Sn;
- a mixed oxide of Ti, Zr, Nb, Si, Sb, Sn, Zn, In;
- a nitride of Si, Zr;
- a mixed nitride of Si, Zr, in a HUD system comprising a p-polarized light source which projects light at an angle of incidence on the glazing of 42 to 72°, to reflect said p-polarized light.

Such glazing offers the advantage of optimally reflecting the p-polarized light when projected at an angle of incidence of 42 to 72°.

EXAMPLES

All optical parameters are given for illuminant D65, 2° for reflection or transmission levels and illuminant D65, 10° for color indexes (a* and b*).

All refractive indices are measured at a wavelength of 550 nm, unless otherwise indicated.

Glazings were provided, comprising a first sheet of clear float glass of 1.8 mm and a second sheet of clear float glass of 1.4 mm, laminated with a clear PVB sheet of 0.76 mm.

Several first coatings were deposited on the second surface of the inner sheet of glass (S4), with "high/low" sequence as outlined in the following Tables.

A second coating comprising 2 silver layers and 3 dielectric layers may have been deposited on the first surface of the inner sheet of glass (S3), as will be indicated in the subsequent examples.

The glazings were then arranged in the path of a light emitted by a light source. The light source is configured to emit normal light or p-polarized light. Behavior of the glazing towards the incident light is presented in the following tables.

Parameters measured concerning external reflection ($RV_{(out)}$) were as follows:
a) Illuminant A, 2°
Tv=transmission in the visible range
$RV_{(out)}$ (%)=external reflection in the visible range at a «standard» incidence angle of 8°
$RV_{(in)}$ (%)=interior reflection in the visible range for unpolarised light at an incidence angle close to the Brewster angle (55°), also referred to as R125(in), if the incidence angle is referenced from the opposite side of the glazing (i.e. 180°-55°)
Rp_pol (%)=interior reflection of p-polarised light in the visible range and at an incidence angle close to the Brewster angle (55°)—also referred to as Rp_pol 125° if the incidence angle is referenced from the opposite side of the glazing (i.e. 180°-55°)
$R172_{(in)}$ (%)=interior reflection in the visible range at a «standard» incidence angle of 8° (or 172° if referred to the external surface of the glazing).
b) Illuminant D65, 2°
Tv (%)=transmission in the visible range
c) Illuminant D65, 10°
a* $R_{out}$=a* color index of external reflection at 8°
b* $R_{out}$=b* color index of external reflection at 8°
a*_$R_{in}$=a* R125=a* color index of interior reflection at 125°
b*_$R_{in}$=b* R125=b*color index of interior reflection at 125° a
*_$R_{p\_pol}$=a* R125p_pol=a* color index of interior reflection at 125° for p-polarized light
b*_$R_{p\_pol}$=b* R125p_pol=b* color index of interior reflection at 125° for p-polarized light
a* R172=a* color index of interior reflection at 172°
b* R172=b* color index of interior reflection at 172°
Results generally indicate
transmission of visible light >70%
exterior reflection maintained at moderate level with appealing reflected aesthetics as indicated by color indices at angles of 8° and 55°.
optical properties in interior reflection, such as Rp-pol at 55° incidence improved when 4 layers or more are provided, up to levels of 13 to 14% while maintaining a global interior reflection at 55° of 14 to 17% with high refractive index layers of mixed titanium zirconium oxide at a ratio of 65/35 wt %, optionally with mixed silicon titanium oxide at a ratio of 92/8 wt %; and with the low refractive index layer being silicon oxide doped with aluminium (2%)

These results indicate the suitability of the present vehicle glazing in a HUD system as claimed.

Examples 1 to 5, Comparative Example 1

Glazings comprising a first sheet of clear float glass of 1.8 mm and a second sheet of clear float glass of 1.4 mm were provided, laminated with a clear PVB sheet of 0.76 mm. Several first coatings were deposited on the inner sheet of glass, with "high/low" sequence as outlined in Tables 2 and 3.

The Examples 1 to 5 and Comparative example 1 had a high refractive index layer having a same optical thickness of 172.3 nm, while the low refractive index layer had the same optical thickness of 145.1 nm. Therefore, the geometrical thickness and refractive indices are outlined in the tables, with geometrical thickness=optical thickness/refractive index.

Comparative example 1 based on titanium oxide having a refractive index of 2.35 (550 nm), had a p-polarized light reflection of 10.2% at an incident angle of 55°.

Example 1 based on TZO having a refractive index of 2.33 (550 nm), had a p-polarized light reflection of 9.9% at an incident angle of 55°. Example 2 with SiZrN had p-polarized light reflection >7.0% at an incident angle of 55°. Example 3 with TSO had p-polarized light reflection >6.0% at an incident angle of 55°. Examples 4 and 5 with SiN and Zinc-Tin-oxide respectively had p-polarized light reflection >4.0% at an incident angle of 55°. They all had satisfying aesthetics with regard to color indices.

Best materials for the high refractive index layer, in order of performance are thus mixed titanium zirconium oxide with a refractive index ≥2.0 providing for a p-polarized light reflection >9.0% at an incident angle of 55°, mixed silicon zirconium nitride, mixed titanium silicon oxide, aluminium doped silicon nitride and mixed zinc tin oxide.

The first coatings of Examples 1 to 5 were able to withstand a thermal treatment and maintain their optical properties, while Comparative example 1 did not withstand a thermal treatment.

Examples 6 to 13

Glazings comprising a first sheet of clear float glass of 1.8 mm and a second sheet of clear float glass of 1.4 mm were provided, laminated with a clear PVB sheet of 0.76 mm. Several first coatings were deposited on the inner sheet of glass, with "high/low" sequence as outlined in Tables 4 and 5.

The high refractive index layer in Example 6 was TZO, while the high refractive index layer in Example 7 to 11 was based on sublayers of TZO and TSO. The high refractive index layer in Examples 12 and 13 having two "high/low" sequences were TZO or TSO.

Optical properties indicated satisfying aesthetics with regard to color indices.

Examples 6 and 7 had a p-polarized light reflection >10.0% at an incident angle of 55°. Examples 8 to 11 had a p-polarized light reflection >9.0% at an incident angle of 55°. Examples 12 and 13 had a p-polarized light reflection >12.0% at an incident angle of 55°.

Examples 14 to 22

Glazings of Examples 14 to 22 were provided, comprising a first sheet of clear float glass of 1.8 mm and a second sheet of clear float glass of 1.4 mm, laminated with a clear PVB sheet of 0.76 mm. Several first coatings were deposited on the second surface of the inner sheet of glass (S4), with "high/low" sequence as outlined in Tables 6 and 7.

A second coating comprising 2 silver layers and 3 dielectric layers was deposited on the first surface of the inner sheet of glass (S3), as outlined in Stack table 1, deposited by vacuum sputtering:

STACK TABLE 1

| Glass | ZnSnOx | ZnO | Ag | TiOx | ZnSnOx |
|---|---|---|---|---|---|
| nm | 19 | 10 | 10.5 | 6 | 66 |
| Glass | ZnO | Ag | TiOx | ZnSnOx | TiOx |
| nm | 10 | 9.4 | 5.3 | 19 | 5 |

The high refractive index layer in Example 14 to 18 were based on sublayers of TZO and TSO. The high refractive index layers in Examples 19 to 22 having two "high/low" sequences were TZO or TSO.

Optical properties indicated satisfying aesthetics with regard to color indices.

Examples 14 to 18 had a p-polarized light reflection >10.0% at an incident angle of 55° (Table 7). Examples 19 to 22 had a p-polarized light reflection >13.0% at an incident angle of 55° (Table 7).

Examples 23 to 27, Comparative Example 2

Glazings of Examples 23 to 27 were provided, comprising a first sheet of clear float glass of 1.8 mm and a second sheet of clear float glass of 1.4 mm, laminated with a clear PVB sheet of 0.76 mm. Several first coatings were deposited on the second surface of the inner sheet of glass (S4), with "high/low" sequence as outlined in Tables 8 and 9.

A second coating comprising 2 silver layers and 3 dielectric layers was deposited on the first surface of the inner sheet of glass (S3), as outlined in Stack table 1.

Comparative example 2 based on titanium oxide having a refractive index of 2.35 (550 nm), had a p-polarized light reflection of 11.29% at an incident angle of 55°.

Example 23 based on TZO having a refractive index of 2.33 (550 nm), had a p-polarized light reflection of 10.99% at an incident angle of 55°. Example 24 with SiZrN had p-polarized light reflection >8.0% at an incident angle of 55°. Example 25 with TSO had p-polarized light reflection >7.0% at an incident angle of 55°. Examples 26 and 27 with SiN:Al and Zinc-Tin-oxide respectively had p-polarized light reflection >5.0% at an incident angle of 55°. They all had satisfying aesthetics with regard to color indices.

The first coatings of Examples 23 to 27 were able to withstand a thermal treatment and maintain their optical properties, while Comparative example 2 did not withstand a thermal treatment.

Examples 28 to 30

Glazings of Examples 28 to 30 were provided, comprising a first sheet of clear float glass of 2.1 mm and a second sheet of clear float glass of 1.6 mm, laminated with a clear PVB sheet of 0.76 mm. Several first coatings were deposited on the second surface of the inner sheet of glass (S4), with "high/low" sequence as outlined in Tables 10 and 11.

For Example 29, a second coating comprising 2 silver layers and 3 dielectric layers was deposited on the first surface of the inner sheet of glass (S3), as outlined in Stack table 1.

Example 28 based on TZO having a refractive index of 2.33 (550 nm), had a p-polarized light reflection of 10.4% at an incident angle of 55°. Example 29 had p-polarized light reflection >11.0% at an incident angle of 55°. Example 30 had p-polarized light reflection >12.0% at an incident angle of 55°.

Examples 28 to 30 all had satisfying aesthetics with regard to color indices.

The first coatings of Examples 28 to 30 were able to withstand a thermal treatment and maintain their optical properties. A comparative example with a $TiO_2$ layer as high refractive index layer was not provided, as it did not withstand the thermal treatment.

Example 31, Comparative Examples 3 and 4

Comparative examples 3 and 4 relate to Examples 3 and 5 of WO2019/046157A1, having a reflectivity of p-polarized light of 11.52% and 11.15% respectively, together with a total reflection of 15.84% and 15.46% respectively (recalculated).

Example 31 was provided with a first coating having a high refractive index layer of TZO of 73.2 nm, and a low refractive index layer of $SiO_2$ of 99.5 nm. Example 31 is characterized by a reflectivity of p-polarized light of 11.30% and a total reflection of 12.10%.

This indicates that for an equivalent reflection of p-polarized light, a first coating in a HUD as per the present invention allows for less reflection, which is useful to reduce annoyance from the reflection of the dashboard onto the vehicle glazing for example.

Example 32 and 33, Comparative Examples 5 to 9-Table 12

Example 32 was provided with a first coating having a high refractive index layer of TZO of 65 nm, and a low refractive index layer of $SiO_2$ of 80 nm. Example 32 is characterized by a total reflection of 12.4% and a reflectivity of p-polarized light of 10.4%.

Example 33 was provided with a first coating having a high refractive index layer of TZO of 80 nm, and a low refractive index layer of $SiO_2$ of 110 nm. Example 33 is characterized by a total reflection of 12.6% and a reflectivity of p-polarized light of 9.1%.

Both Examples 32 and 33 are able to withstand the heat treatment of a bending step carried out at a temperature of 650° C. for 5 minutes.

Comparative example 5 was provided with a first coating having a high refractive index layer of TZO of 40 nm, and a low refractive index layer of $SiO_2$ of 65 nm. Both values are out of the ranges as claimed for the high and low refractive index layers. Comparative example 5 is characterized by a total reflection of 19.6% (>21%) and a reflectivity of p-polarized light of 7.5% (<8%).

Comparative example 6 was provided with a first coating having a high refractive index layer of TZO of 40 nm, and a low refractive index layer of $SiO_2$ of 170 nm. Both values are out of the ranges as claimed for the high and low refractive index layers. Comparative example 6 is characterized by a total reflection of 22.60% (>21%) and a reflectivity of p-polarized light of 7.5% (<8%).

Both Comparative examples 5 and 6 are able to withstand the heat treatment of a bending step carried out at a temperature of 650° C. for 5 minutes, due to the presence of TZO, however the thickness ranges being outside of these as claimed, their optical properties in terms of total reflection and reflectivity of p-polarized light render them unsuitable in the scope of the present invention.

Comparative example 7 was provided with a first coating having a high refractive index layer of $TiO_2$ of 65.6 nm, and a low refractive index layer of $SiO_2$ of 102 nm, according to Example 1 of CN204166197U. Comparative example 7 is characterized by a total reflection of 12.4% and a reflectivity of p-polarized light of 11.5%. Although Comparative example 7 is within the acceptable ranges of values for optical measurements, it did not withstand the heat treatment of a bending step carried out at a temperature of 650° C. for 5 minutes, due to the presence of the titanium dioxide as high refractive index layer material.

Comparative example 8 was provided with a first coating having 4 layers, with a layer of ZSO in contact with the glass of 13.8 nm, and a layer of SiON having a refractive index of from 1.45 to 1.9, of 76.1 nm, under the high refractive index layer of $TiO_2$ of 74 nm, and a layer of $SiO_2$ of 92.1 nm, according to Embodiment 1 of CN206147178U.

Comparative example 9 was provided with a first coating having 3 layers, with a layer of ZSO in contact with the glass of 128 nm, under the high refractive index layer of $TiO_2$ of 75 nm, and a layer of $SiO_2$ of 110 nm, according to Embodiment 3 of CN206147178U.

Although Comparative examples 8 and 9 are within the acceptable ranges of values for optical measurements, they did not withstand the heat treatment of a bending step carried out at a temperature of 650° C. for 5 minutes, due to the presence of the titanium dioxide as high refractive index layer material.

Example 34 and 35, Comparative Examples 10 and 11—Table 13

Example 34 was provided with a first coating having a first high refractive index layer of TZO of 2 nm, a first low refractive index layer of $SiO_2$ of 165 nm, a second high refractive index layer of TZO of 55 nm, a second low refractive index layer of $SiO_2$ of 75 nm. Example 34 is characterized by a total reflection of 17.3% and a reflectivity of p-polarized light of 11.7%.

Example 35 was provided with a first coating having a first high refractive index layer of TZO of 12 nm, a first low refractive index layer of $SiO_2$ of 168 nm, a second high refractive index layer of TZO of 80 nm, a second low refractive index layer of $SiO_2$ of 120 nm. Example 35 is characterized by a total reflection of 20.4% and a reflectivity of p-polarized light of 14.6%.

Both Examples 34 and 35 are able to withstand the heat treatment of a bending step carried out at a temperature of 650° C. for 5 minutes.

Comparative example 10 was provided with a first high refractive index layer of TZO of 18 nm, a first low refractive index layer of $SiO_2$ of 140 nm, a second high refractive index layer of TZO of 40 nm, a second low refractive index layer of $SiO_2$ of 170 nm. Layer thicknesses are out of the ranges as claimed for the high and low refractive index layers. Comparative example 10 is characterized by a total reflection of 36.2% (>21%), a reflectivity of p-polarized light of 13.6% and a light transmission of 62.0% (<70.0%, which is unacceptable in the field of automotive).

Comparative example 11 was provided with a first high refractive index layer of TZO of 25 nm, a first low refractive index layer of $SiO_2$ of 130 nm, a second high refractive index layer of TZO of 30 nm, a second low refractive index layer of $SiO_2$ of 65 nm. Layer thicknesses are out of the ranges as claimed for the high and low refractive index layers. Comparative example 11 is characterized by a total reflection of 37.6% (>21%), a reflectivity of p-polarized light of 10.8% and a light transmission of 61.1% (<70.0%).

TABLE 2

|  |  | Geometrical thickness (nm) | Refractive indices at 550 nm | Tv (illA) | Tv (illD65, 2°) | Rv (out) | Rout incidence angle 8° | | incidence angle 55° | | incidence angle 35° | |
|---|---|---|---|---|---|---|---|---|---|---|---|---|
|  |  |  |  |  |  |  | a*_Rout | b*_Rout | a*_R55 | b*_R55 | a*_R35 | b*_R35 |
| Comparative Example 1 | TiO2/SiO2 | 73.2/99.5 | 2.35/1.46 | 87.0 | 86.7 | 10.9 | −2.12 | −10.06 | 6.37 | −1.51 | 2.87 | −8.34 |
| Example 1 | TZO/SiO2 | 73.9/99.5 | 2.33/1.46 | 87.2 | 86.9 | 10.6 | −2.68 | −10.08 | 6.16 | −1.84 | 2.45 | −8.57 |
| Example 2 | SiZrN/SiO2 | 78.0/99.5 | 2.21/1.46 | 87.1 | 86.7 | 8.5 | −1.58 | −11.98 | 6.62 | −2.71 | 3.55 | −10.20 |
| Example 3 | TSO/SiO2 | 79.4/99.5 | 2.17/1.46 | 89.8 | 89.5 | 8.1 | −2.42 | −12.88 | 6.54 | −3.96 | 3.12 | −11.54 |
| Example 4 | SiN/SIO2 | 84.9/99.5 | 2.03/1.46 | 90.0 | 89.7 | 6.2 | −0.64 | −14.19 | 6.56 | −3.49 | 4.43 | −12.07 |
| Example 5 | ZSO5/SiO2 | 85.3/99.5 | 2.02/1.46 | 91.5 | 91.2 | 6.2 | −1.28 | −14.28 | 6.49 | −4.07 | 4.04 | −12.57 |

TABLE 3

|  |  | Geometrical thickness (nm) | Refractive indices at 550 nm | Rv (in) | Rin incidence angle 55° | | | | | | incidence angle 172° | | |
|---|---|---|---|---|---|---|---|---|---|---|---|---|---|
|  |  |  |  |  | Rp_pol | a*_Rin | b*_Rin | a*_Rp_pol | b*_Rp_pol | | R172(in) | a*_R172 | b*_R172 |
| Comparative Example 1 | TiO2/SiO2 | 73.2/99.5 | 2.35/1.46 | 15.2 | 10.2 | 7.11 | −1.64 | −2.24 | 11.50 | | 11.0 | −1.69 | −10.73 |
| Example 1 | TZO/SiO2 | 73.9/99.5 | 2.33/1.46 | 14.9 | 9.9 | 6.87 | −1.98 | −2.73 | 11.62 | | 10.7 | −2.31 | −10.74 |
| Example 2 | SiZrN/SiO2 | 78.0/99.5 | 2.21/1.46 | 12.3 | 7.3 | 7.43 | −3.44 | −1.90 | 9.56 | | 8.3 | −1.73 | −13.23 |
| Example 3 | TSO/SiO2 | 79.4/99.5 | 2.17/1.46 | 12.4 | 6.8 | 7.08 | −4.10 | −2.69 | 9.03 | | 8.1 | −2.24 | −13.62 |
| Example 4 | SIN/SiO2 | 84.9/99.5 | 2.03/1.46 | 10.2 | 4.3 | 7.04 | −4.12 | −1.04 | 7.21 | | 6.0 | −0.93 | −15.46 |
| Example 5 | ZSO5/SiO2 | 85.3/99.5 | 2.02/1.46 | 10.5 | 4.3 | 6.83 | −3.96 | −1.41 | 7.07 | | 6.2 | −1.24 | −15.18 |

TABLE 4

| | | Geometrical thickness (nm) | Tv (illA) | Tv (illD65, 2°) | Rv (out) | Rout incidence angle 8° | | incidence angle 55° | | incidence angle 35° | |
|---|---|---|---|---|---|---|---|---|---|---|---|
| | | | | | | a*_Rout | b*_Rout | a*_R55 | b*_R55 | a*_R35 | b*_R35 |
| Example 6 | TZO/SiO2 | 64.8/131.5 | 79.04 | 77.47 | 18.50 | −11.76 | −11.75 | −3.62 | −15.94 | −8.77 | −16.52 |
| Example 7 | TZO/TSO/SiO2 | 63.9/1.0/124.0 | 81.47 | 80.01 | 16.14 | −10.05 | 14.67 | −0.38 | −15.38 | −6.10 | −17.95 |
| Example 8 | TZO/TSO/SiO2 | 45.3/25.0/126.6 | 80.12 | 78.68 | 17.45 | −12.21 | −10.12 | −3.68 | −15.21 | −9.15 | −15.33 |
| Example 9 | TZO/TSO/SiO2 | 45.8/25.0/116.3 | 83.32 | 82.07 | 14.35 | −9.72 | −13.74 | 0.77 | −13.89 | −5.33 | −16.87 |
| Example 10 | TZO/TSO/SiO2 | 38.9/32.5/125.8 | 80.77 | 79.39 | 16.82 | −12.37 | −9.50 | −3.61 | −14.95 | −9.25 | −14.91 |
| Example 11 | TZO/TSO/SiO2 | 39.5/32.5/117.5 | 83.29 | 82.05 | 14.37 | −10.54 | −12.38 | −0.12 | −14.03 | −6.33 | −16.21 |
| Example 12 | TZO/SiO2/TSO/SiO2 | 11.2/157.7/64.1/123.2 | 78.90 | 77.74 | 18.70 | −16.48 | 2.72 | −2.00 | −14.65 | −12.47 | −8.30 |
| Example 13 | TSO/SiO2/TZO/SiO2 | 6.0/171.1/63.9/116.9 | 81.28 | 80.45 | 16.40 | −7.71 | −7.51 | 0.29 | 8.81 | −5.69 | −8.83 |

TABLE 5

| | | Geometrical thickness (nm) | Rin incidence angle 55° | | | | | | incidence angle 172° | | |
|---|---|---|---|---|---|---|---|---|---|---|---|
| | | | Rv (in) | Rp_pol | a*_Rin | b*_Rin | a*_Rp_pol | b*_Rp_pol | R172(in) | a*_R172 | b*_R172 |
| Example 6 | TZO/SiO2 | 64.8/131.5 | 15.71 | 10.39 | −2.81 | −17.44 | −3.01 | 2.16 | 18.91 | −11.10 | −12.77 |
| Example 7 | TZO/TSO/SiO2 | 63.9/1.0/124.0 | 14.87 | 10.39 | 0.52 | −16.78 | −3.02 | 2.18 | 16.46 | −9.36 | −15.80 |
| Example 8 | TZO/TSO/SiO2 | 45.3/25.0/126.6 | 14.98 | 9.54 | −2.97 | −16.64 | −3.02 | 3.85 | 17.82 | −11.68 | −11.01 |
| Example 9 | TZO/TSO/SiO2 | 45.8/25.0/116.3 | 13.99 | 9.53 | 1.59 | −15.13 | −3.02 | 4.40 | 14.59 | −9.18 | −14.76 |
| Example 10 | TZO/TSO/SiO2 | 38.9/32.5/125.8 | 14.54 | 9.03 | −2.96 | −16.34 | −2.97 | 4.63 | 17.17 | −11.91 | −10.33 |
| Example 11 | TZO/TSO/SiO2 | 39.5/32.5/117.5 | 13.69 | 9.03 | 0.62 | −15.28 | −2.96 | 5.29 | 14.62 | −10.09 | −13.31 |
| Example 12 | TZO/SiO2/TSO/SiO2 | 11.2/157.7/64.1/123.2 | 17.86 | 12.34 | −0.90 | −16.04 | −9.16 | 4.03 | 19.13 | −16.18 | 2.31 |
| Example 13 | TSO/SiO2/TZO/SiO2 | 6.0/171.1/63.9/116.9 | 17.87 | 13.15 | 1.26 | −9.79 | −5.30 | 9.23 | 16.75 | −6.99 | −8.47 |

TABLE 6

| | | Geometrical thickness (nm) | Tv (illA) | Tv (illD65, 2°) | Rv (out) | Rout incidence angle 8° | | incidence angle 55° | | incidence angle 35° | |
|---|---|---|---|---|---|---|---|---|---|---|---|
| | | | | | | a*_Rout | b*_Rout | a*_R55 | b*_R55 | a*_R35 | b*_R35 |
| Example 14 | TZO/TSO/SiO2 | 65.1/0.1/111.1 | 74.57 | 73.50 | 13.68 | −9.65 | −13.21 | −0.01 | −11.43 | −5.87 | −14.52 |
| Example 15 | TZO/TSO/SiO2 | 45.5/25.0/93.0 | 76.99 | 76.57 | 11.65 | −5.28 | −10.64 | 1.53 | −4.32 | −1.92 | −9.24 |
| Example 16 | TZO/TSO/SiO2 | 45.6/25.0/101.1 | 76.20 | 75.41 | 12.30 | −8.25 | −12.30 | 0.99 | −8.89 | −4.32 | −12.78 |
| Example 17 | TZO/TSO/SiO2 | 39.3/32.5/90.8 | 77.48 | 77.15 | 11.23 | −4.91 | −9.96 | 1.62 | −3.56 | −1.61 | −8.44 |
| Example 18 | TZO/TSO/SiO2 | 39.2/32.5/97.9 | 76.94 | 76.28 | 11.67 | −7.50 | −11.78 | 1.35 | −7.64 | −3.58 | −11.84 |
| Example 19 | TZO/SiO2/TSO/SiO2 | 13.3/168.5/66.3/98.3 | 74.61 | 74.67 | 13.78 | −7.77 | 5.20 | 0.71 | −0.43 | −4.43 | 2.21 |
| Example 20 | TZO/SiO2/TSO/SiO2 | 10.1/163.8/70.5/113.0 | 72.36 | 71.68 | 15.64 | −14.00 | 2.58 | −2.97 | −9.45 | −11.92 | −3.79 |
| Example 21 | TSO/SiO2/TZO/SiO2 | 10.9/172.4/63.5/101.3 | 73.46 | 73.39 | 14.75 | −6.20 | 0.22 | 0.23 | −1.10 | −4.41 | −0.01 |
| Example 22 | TSO/SiO2/TZO/SiO2 | 6.3/197.2/65.3/114.4 | 73.90 | 73.17 | 14.30 | −5.92 | −12.61 | −1.93 | −7.21 | −5.74 | −9.75 |

TABLE 7

| | | Geometrical thickness (nm) | Rv (in) | Rp_pol | incidence angle 55° a*_Rin | b*_Rin | a*_Rp_pol | b*_Rp_pol | R172(in) | incidence angle 172° a*_R172 | b*_R172 |
|---|---|---|---|---|---|---|---|---|---|---|---|
| Example 14 | TZO/TSO/SiO2 | 65.1/0.1/111.1 | 14.30 | 11.43 | 5.54 | −15.49 | −1.86 | −7.76 | 13.84 | −7.60 | −18.30 |
| Example 15 | TZO/TSO/SiO2 | 45.5/25.0/93.0 | 15.44 | 10.61 | 7.37 | −4.42 | −1.76 | −7.34 | 11.18 | −2.02 | −15.24 |
| Example 16 | TZO/TSO/SiO2 | 45.6/25.0/101.1 | 14.07 | 10.61 | 6.89 | −11.59 | −1.74 | −7.36 | 12.01 | 5.93 | −17.27 |
| Example 17 | TZO/TSO/SiO2 | 39.3/32.5/90.8 | 15.23 | 10.11 | 7.47 | −3.15 | −1.63 | −7.18 | 10.62 | −1.56 | −14.39 |
| Example 18 | TZO/TSO/SiO2 | 39.2/32.5/97.9 | 13.96 | 10.11 | 7.35 | −9.61 | −1.63 | −7.30 | 11.18 | −5.00 | −16.67 |
| Example 19 | TZO/SiO2/TSO/SiO2 | 13.3/168.5/66.3/98.3 | 21.16 | 14.37 | 6.06 | 0.55 | −7.24 | 2.52 | 14.02 | −5.73 | 6.23 |
| Example 20 | TZO/SiO2/TSO/SiO2 | 10.1/163.8/70.5/113.0 | 17.03 | 13.01 | 1.30 | −12.77 | −6.25 | 0.23 | 16.44 | −13.68 | 2.24 |
| Example 21 | TSO/SiO2/TZO/SiO2 | 10.9/172.4/63.5/101.3 | 21.04 | 15.76 | 5.39 | −0.58 | −5.22 | 2.85 | 15.31 | −3.42 | −1.57 |
| Example 22 | TSO/SiO2/TZO/SiO2 | 6.3/197.2/65.3/114.4 | 16.32 | 13.32 | 2.42 | −9.60 | −1.21 | 0.45 | 14.67 | −2.59 | −17.82 |

TABLE 8

| | | Geometrical thickness (nm) | Tv (illA) | Tv (illD65, 2°) | Rv (out) | Rout incidence angle 8° a*_Rout | b*_Rout | incidence angle 55° a*_R55 | b*_R55 | incidence angle 35° a*_R35 | b*_R35 |
|---|---|---|---|---|---|---|---|---|---|---|---|
| Comparative Example 2 | TiO2/SiO2 | 73.2/99.5 | 76.17 | 75.65 | 12.34 | −7.84 | −7.99 | 1.29 | −5.71 | −3.92 | −8.60 |
| Example 23 | TZO/SiO2 | 73.4/98.5 | 76.51 | 76.01 | 12.04 | −7.77 | −8.12 | 1.27 | −5.44 | −3.82 | −8.54 |
| Example 24 | SiZrN/SiO2 | 77.1/85.7 | 76.85 | 76.84 | 10.18 | −3.26 | −5.29 | 1.36 | 0.35 | −0.71 | −3.28 |
| Example 25 | TSO/SiO2 | 79.2/84.5 | 79.23 | 79.26 | 9.74 | −3.54 | −5.60 | 1.30 | −0.02 | −0.85 | −3.70 |
| Example 26 | SIN:Al/SiO2 | 80.1/77.7 | 78.54 | 78.75 | 9.28 | −2.39 | −1.81 | −0.42 | 2.19 | −1.28 | 0.46 |
| Example 27 | ZSO5/SiO2 | 81.5/77.4 | 79.82 | 80.01 | 9.13 | −2.50 | −2.41 | −0.29 | 1.92 | −1.23 | −0.14 |

TABLE 9

| | | Geometrical thickness (nm) | Rv (in) | Rp_pol | incidence angle 55° a*_Rin | b*_Rin | a*_Rp_pol | b*_Rp_pol | R172(in) | incidence angle 172° a*_R172 | b*_R172 |
|---|---|---|---|---|---|---|---|---|---|---|---|
| Comparative Example 2 | TiO2/SiO2 | 73.2/99.5 | 14.72 | 11.29 | 7.07 | −6.79 | −0.91 | −2.74 | 12.08 | −5.68 | −11.49 |
| Example 23 | TZO/SiO2 | 73.4/98.5 | 14.65 | 10.99 | 7.05 | −6.33 | −1.35 | −3.22 | 11.69 | −5.59 | −11.69 |
| Example 24 | SiZrN/SiO2 | 77.1/85.7 | 14.57 | 8.44 | 7.13 | 3.71 | −0.65 | −6.22 | 8.81 | 0.56 | −8.46 |
| Example 25 | TSO/SiO2 | 79.2/84.5 | 14.62 | 7.93 | 6.75 | 3.02 | −1.06 | −7.65 | 8.66 | 0.17 | −8.42 |
| Example 26 | SIN:Al/SiO2 | 80.1/77.7 | 14.35 | 5.57 | 4.20 | 7.34 | 0.17 | −12.52 | 7.72 | 1.97 | −3.35 |
| Example 27 | ZSO5/SiO2 | 81.5/77.4 | 14.48 | 5.58 | 4.07 | 7.40 | −0.31 | −12.37 | 7.82 | 1.61 | −3.39 |

TABLE 11

| | | Geometrical thickness (nm) | Rpp % @ 55° R_55° A/2° | a*_55° Cielab/D65/10° | b*_55° | Y_8° D65/2° | a*_8° | b*_8° | Rin % @ 55° Y_55° A/2° | a*_55° | b*_55° |
|---|---|---|---|---|---|---|---|---|---|---|---|
| Example 28 | TZO/SiO2 | 64.7/123.6 | 10.4 | −2.3 | 1.5 | 16.3 | −7.4 | −15.9 | 15.2 | 1.0 | −17.0 |
| Example 29 | TZO/SiO2 | 64.7/123.6 | 11.5 | 1.4 | −4.3 | | | | 14.9 | | |
| Example 30 | TZO/SiO2/TZO/SiO2 | 3.4/173.9/65.2/112.6 | 12.5 | −5.3 | 0.9 | 15.8 | −6.4 | −11.0 | 17.7 | 4.5 | −12.7 |

TABLE 10

|  |  | Geometrical thickness (nm) | Tr Y A/2° | Tr % Y A/2° | a* | b* | Rout Y_8° D65/2° | a*_8° | b*_8° | Rout % @ 55° Y_55° A/2° | a*_55° | b*_55° |
|---|---|---|---|---|---|---|---|---|---|---|---|---|
| Example 28 | TZO/SiO2 | 64.7/123.6 | 83.1 | 83.1 | 2.4 | 7.3 | 16.2 | −7.7 | −15.4 | 15.1 | 1.4 | −17.9 |
| Example 29 | TZO/SiO2 | 64.7/123.6 |  | 70.2 | 2.7 | 6.4 |  |  |  | 16.7 | 5.8 | −7.7 |
| Example 30 | TZO/SiO2/ TZO/SiO2 | 3.4/173.9/65.2/112.6 |  | 83.1 | 2.0 | 4.9 | 15.7 | −6.7 | −10.6 | 17.5 | 4.2 | −12.1 |

TABLE 12

|  |  | Geometrical thickness (nm) | Tv % @ 8° A 2° | Rv(in) % @ 8° A 2° | Rp_pol % @ 55° A 2° |
|---|---|---|---|---|---|
| Example 32 | TZO/SiO2 | 65/80 | 85.8 | 12.4 | 10.4 |
| Example 33 | TZO/SiO2 | 80/110 | 85.3 | 12.6 | 9.1 |
| Comparative example 5 | TZO/SiO2 | 40/65 | 78.7 | 19.6 | 7.5 |
| Comparative example 6 | TZO/SiO2 | 40/170 | 75.4 | 22.6 | 7.5 |
| Comparative example 7 | TiO2/SiO2 | 65.6/102 | 85.6 | 12.4 | 11.5 |
| Comparative example 8 | ZSO/SiON/ TiO2/SiO2 | 13.8/76.1/74/92.1 | 85.7 | 12.3 | 10.2 |
| Comparative example 9 | ZSO/TiO2/ SiO2 | 128/75/110 | 84.7 | 13.0 | 9.6 |

TABLE 13

|  |  | Geometrical thickness (nm) | Tv % @ 8° A 2° | Rv(in) % @ 8° A 2° | Rp_pol A 2° |
|---|---|---|---|---|---|
| Example 34 | TZO/SiO2/ TZO/SiO2 | 2/165/55/75 | 81.1 | 17.3 | 11.7 |
| Example 35 | TZO/SiO2/ TZO/SiO2 | 12/168/80/120 | 77.9 | 20.4 | 14.6 |
| Comparative example 10 | TZO/SiO2/ TZO/SiO2 | 18/140/40/170 | 62.0 | 36.2 | 13.6 |
| Comparative example 11 | TZO/SiO2/ TZO/SiO2 | 25/130/30/65 | 61.1 | 37.6 | 10.8 |

The invention claimed is:

1. A HUD system comprising:
a light source projecting a p-polarized light towards a glazing,
the glazing comprising an outer sheet of glass having a first surface and a second surface, and an inner sheet of glass having a first surface and a second surface,
wherein the second surface of the inner sheet of glass comprises a first coating, the outer sheet of glass and inner sheet of glass bonded by at least one sheet of interlayer material providing contact between the first surface of the inner sheet of glass and the second surface of the outer sheet of glass,
wherein the first coating comprises:
at least one high refractive index layer having a thickness from 50 to 100 nm, and
at least one low refractive index layer having a thickness from 70 to 160 nm, and
wherein the least one high refractive index layer comprises at least one of:
a mixed titanium zirconium oxide, a mixed titanium silicon oxide, a mixed niobium zirconium oxide, a mixed indium tin oxide, a mixed zinc aluminium oxide, a mixed antimony tin oxide, and a mixed titanium zinc oxide,
wherein the first coating has p-polarized light reflection ≥7% at an incident angle of the p-polarized light of 55° and a total reflectance remaining ≤21%, and
wherein the glazing comprising the first coating has been heated to at least 560° C. for three or more minutes.

2. The HUD system according to claim 1, wherein the least one high refractive index layer comprises at least one of: a mixed titanium zirconium oxide, a mixed titanium silicon oxide, and a mixed niobium zirconium oxide.

3. The HUD system according to claim 1, wherein the p-polarized light is incident to the glazing at an angle of 42 to 72 degrees.

4. The HUD system according to claim 1, further comprising a second coating comprising n IR reflective functional layer based layers and an n+1 dielectric layers, wherein each IR reflective functional layer based layer is located between two dielectric layers on at least one of the first surface of the inner sheet of glass or the second surface of the outer sheet of glass.

5. The HUD system according to claim 4, wherein the second coating comprises the following sequential layers:
a base dielectric layer comprising a base dielectric lower layer and a base dielectric upper layer which is of a different composition to that of the base dielectric lower layer, the base dielectric upper layer comprising either one of zinc oxide or a mixed oxide of Zn and at least one additional material X, in which a ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
a first infra-red reflecting layer,
a first barrier layer,
a central dielectric layer comprising a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which a ratio Y/Zn in the base dielectric upper layer is between 0.02 and 0.5 by weight and in which Y is one or more of the materials selected from the group comprising Sn, Al, Ga, In, Zr, Sb, Bi, Mg, Nb, Ta and Ti,
a second infra-red reflecting layer,
a second barrier layer, and
a top dielectric layer.

6. The HUD system according to claim 5, wherein the first infra-red reflecting layer comprises silver, gold, platinum, or mixtures thereof.

7. The HUD system according to claim 4, wherein the second coating comprises the following sequential layers:
- a base dielectric layer comprising a base dielectric lower layer and a base dielectric upper layer which is of a different composition to that of the base dielectric lower layer, the base dielectric upper layer comprising either one of zinc oxide or a mixed oxide of Zn and at least one additional material X, in which a ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
- a first infra-red reflecting layer,
- a first barrier layer,
- a second dielectric layer comprising a second dielectric lower layer and a second dielectric upper layer which is of a different composition to that of the second dielectric lower layer, the second dielectric lower layer being in direct contact with the first barrier layer and the second dielectric upper layer; the second dielectric upper layer comprising either one of zinc oxide or a mixed oxide of Zn and at least one additional material Y, in which a ratio Y/Zn in the second dielectric upper layer is between 0.02 and 0.5 by weight and in which Y is one or more of the materials selected from the group comprising Sn, Al, Ga, In, Zr, Sb, Bi, Mg, Nb, Ta and Ti,
- a second infra-red reflecting layer,
- a second barrier layer,
- a third dielectric layer comprising a third dielectric lower layer and a third dielectric upper layer which is of a different composition to that of the third dielectric lower layer, the third dielectric lower layer being in direct contact with the second barrier layer and the third dielectric upper layer; the third dielectric upper layer comprising either one of zinc oxide or a mixed oxide of Zn and at least one additional material Y, in which a ratio Y/Zn in the third dielectric upper layer is between 0.02 and 0.5 by weight and in which Y is one or more of the materials selected from the group comprising Sn, Al, Ga, In, Zr, Sb, Bi, Mg, Nb, Ta and Ti,
- a third infra-red reflecting layer,
- a third barrier layer, and
- a top dielectric layer.

8. The HUD system according to claim 4, wherein the second coating comprises the following sequential layers:
- a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight,
- the base dielectric upper layer comprising a mixed oxide of Zn and Sn having a ratio Sn/Zn ranging from 0.02 to 0.5 by weight,
- a first infra-red reflecting layer comprising metallic silver,
- a first barrier layer,
- a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2,
- the central dielectric upper layer comprising a mixed oxide of Zn and Sn having a ratio Sn/Zn ranging from 0.02 to 0.5 by weight,
- a second infra-red reflecting layer comprising metallic silver,
- a second barrier layer, and
- a top dielectric layer.

9. The HUD system according to claim 8, wherein the second coating comprises the following sequential layers:
- a base dielectric layer comprising a base dielectric lower layer and a base dielectric upper layer which is of a different composition to that of the base dielectric lower layer,
- the base dielectric lower layer comprising a mixed oxide of Zn and Sn having a ratio Sn/Zn ranging from 0.5 to 2 by weight, having a geometrical thickness from 15-25 nm,
- the base dielectric upper layer comprising a mixed oxide of Zn and Sn having a ratio Sn/Zn ranging from 0.02 to 0.5 by weight, having a geometrical thickness from 5-15 nm,
- a first infra-red reflecting layer comprising metallic silver, having a geometrical thickness from 8-16 nm,
- a first barrier layer, having a geometrical thickness from 3-8 nm,
- a central dielectric layer comprising a central dielectric lower layer and a central dielectric upper layer which is of a different composition to that of the central dielectric lower layer being in direct contact with the first barrier layer and comprising a mixed oxide of Zn and Sn having a ratio Sn/Zn ranging from 0.5 to 2, having a geometrical thickness from 58-74 nm,
- the central dielectric upper layer comprising a mixed oxide of Zn and Sn having a ratio Sn/Zn ranging from 0.02 to 0.5 by weight, having a geometrical thickness from 5-15 nm,
- a second infra-red reflecting layer comprising metallic silver, having a geometrical thickness from 8-16 nm,
- a second barrier layer, having a geometrical thickness from 3-8 nm, and
- a top dielectric layer, having a geometrical thickness from 14-22 nm.

10. The HUD system according to claim 4, wherein the second coating comprises the following sequential layers:
- a base dielectric layer comprising a base dielectric lower layer and a base dielectric upper layer which is of a different composition to that of the base dielectric lower layer,
- the base dielectric lower layer comprising a mixed oxide of Zn and Sn having a ratio Sn/Zn ranging from 0.5 to 2 by weight,
- the base dielectric upper layer comprising a mixed oxide of Zn and Sn having a ratio Sn/Zn ranging from 0.02 to 0.5 by weight,
- a first infra-red reflecting layer comprising metallic silver,
- a first barrier layer,
- a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2,
- the second dielectric upper layer comprising a mixed oxide of Zn and Sn having a ratio Sn/Zn ranging from 0.02 to 0.5 by weight, a second infra-red reflecting layer comprising metallic silver,
a second barrier layer,
a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2,
the third dielectric upper layer comprising a mixed oxide of Zn and Sn having a ratio Sn/Zn ranging from 0.02 to 0.5 by weight,
a third infra-red reflecting layer comprising metallic silver,
a third barrier layer, and
a top dielectric layer.

11. The HUD system according to claim 10, wherein the second coating comprises the following sequential layers:
a base dielectric layer comprising a base dielectric lower layer and a base dielectric upper layer which is of a different composition to that of the base dielectric lower layer, the base dielectric lower layer comprising a mixed oxide of Zn and Sn having a ratio Sn/Zn ranging from 0.5 to 2 by weight, having a geometrical thickness from 25-35 nm, the base dielectric upper layer comprising a mixed oxide of Zn and Sn having a ratio Sn/Zn ranging from 0.02 to 0.5 by weight, having a geometrical thickness from 5-15 nm, a first infra-red reflecting layer comprising metallic silver, having a geometrical thickness from 10-16 nm,
a first barrier layer, having a geometrical thickness from 3-8 nm,
a second dielectric layer comprising a second dielectric lower layer and a second dielectric upper layer which is of a different composition to that of the second dielectric lower layer being in direct contact with the first barrier layer and comprising a mixed oxide of Zn and Sn having a ratio Sn/Zn ranging from 0.5 to 2, having a geometrical thickness from 58-74 nm,
the second dielectric upper layer comprising a mixed oxide of Zn and Sn having a ratio Sn/Zn ranging from 0.02 to 0.5 by weight, having a geometrical thickness from 5-15 nm, a second infra-red reflecting layer comprising metallic silver, having a geometrical thickness from 10-17 nm,
a second barrier layer, having a geometrical thickness from 3-8 nm,
a third dielectric layer comprising a third dielectric lower layer and a third dielectric upper layer which is of a different composition to that of the third dielectric lower layer being in direct contact with the second barrier layer and comprising a mixed oxide of Zn and Sn having a ratio Sn/Zn ranging from 0.5 to 2, having a geometrical thickness from 50-75 nm,
the third dielectric upper layer comprising a mixed oxide of Zn and Sn having a ratio Sn/Zn ranging from 0.02 to 0.5 by weight, having a geometrical thickness from 5-15 nm,
a third infra-red reflecting layer comprising metallic silver, having a geometrical thickness from 10-16 nm,
a third barrier layer, having a geometrical thickness from 3-8 nm, and
a top dielectric layer, having a geometrical thickness from 20-40 nm.

12. The HUD system according to claim 4, wherein the second coating is positioned on the first surface of the inner sheet of glass or on the second surface of the outer sheet of glass.

13. The HUD system according to claim 4, wherein the second coating is positioned on the second surface of the outer sheet of glass.

14. The HUD system according to claim 1, wherein the at least one high refractive index layer comprises at least one of: a mixed titanium zirconium oxide, a mixed titanium silicon oxide, a mixed niobium zirconium oxide, an aluminium doped silicon nitride, a zirconium oxide, a mixed indium tin oxide, a mixed zinc aluminium mixed oxide, a mixed antimony tin mixed oxide, a mixed titanium zinc oxide, and a mixed zinc tin oxide.

15. The glazing according to claim 1, wherein the glazing comprising the first coating has been heated to at least 650° C. for five or more minutes.

16. A glazing for use in a HUD system, the glazing comprising:
an outer sheet of glass having a first surface and a second surface, and
an inner sheet of glass having a first surface and a second surface,
wherein the second surface of the inner sheet of glass comprises a first coating, the outer sheet of glass and the inner sheet of glass are bonded by at least one sheet of interlayer material providing contact between the first surface of the inner sheet of glass and the second surface of the outer sheet of glass,
wherein the first coating comprises:
a first layer of high refractive index material having a thickness from 1 to 15 nm, in contact with the glass,
a first layer of low refractive index material having a thickness from 150 to 220 nm, above the first layer of high refractive index material,
a second layer of high refractive index material having a thickness from 50 to 100 nm, above the first layer of low refractive index material, and a second layer of low refractive index material having a thickness from 70 to 160 nm, above the second layer of high refractive index material,
wherein at least one high refractive index layer comprises at least one of:
a mixed titanium zirconium oxide, a mixed titanium silicon oxide, a mixed niobium zirconium oxide, a mixed indium tin oxide, a mixed zinc aluminium oxide, a mixed antimony tin oxide, and a mixed titanium zinc oxide,
wherein the first coating has p-polarized light reflection ≥7% at an incident angle of the p-polarized light of 55° and a total reflectance remaining ≤21%,
wherein the glazing comprising the first coating has been heated to at least 560° C. for three or more minutes, and
wherein the glazing a visible light transmission of 70% or greater.

17. A HUD system comprising:
a light source projecting p-polarized light towards a glazing,
the glazing comprising an outer sheet of glass having a first surface and a second surface, and an inner sheet of glass having a first surface and a second surface,
wherein the second surface of the inner sheet of glass comprises a first coating, the outer sheet of glass and the inner sheet of glass are bonded by at least one sheet of interlayer material providing contact between the first surface of the inner sheet of glass and the second surface of the outer sheet of glass, wherein the first coating comprises
a first layer of high refractive index material having a thickness from 1 to 15 nm, in contact with the glass,
a first layer of low refractive index material having a thickness from 100 to 160 nm, above the first layer of high refractive index material,
a second layer of high refractive index material having a thickness from 1 to 20 nm, above the first layer of low refractive index material, and
a second layer of low refractive index material having a thickness from 20 to 60 nm, above the second layer of high refractive index material,
a third layer of high refractive index material having a thickness from 40 to 100 nm, above the second layer of low refractive index material, and
a third layer of low refractive index material having a thickness from 80 to 140 nm, above the third layer of high refractive index material
wherein at least one high refractive index layer comprises at least one of:
a mixed titanium zirconium oxide, a mixed titanium silicon oxide, a mixed niobium zirconium oxide, a mixed indium tin oxide, a mixed zinc aluminium oxide, a mixed antimony tin oxide, and mixed titanium zinc oxide,
wherein the first coating has p-polarized light reflection ≥7% at an incident angle of the p-polarized light of 55° and a total reflectance remaining ≤21%, and
wherein the glazing comprising the first coating has been heated to at least 560° C. for three or more minutes.

18. A method to provide for a HUD system comprising:
providing for a glazing by assembling an outer sheet of glass, for at least one sheet of interlayer material, and for an inner sheet of glass comprising a first coating on a second surface, the coating comprising:
at least one high refractive index layer having a thickness from 50 to 100 nm, and
at least one low refractive index layer having a thickness from 70 to 160 nm,
wherein the least one high refractive index layer comprises at least one of:
a mixed titanium zirconium oxide, a mixed titanium silicon oxide, a mixed niobium zirconium oxide, a mixed indium tin oxide, a mixed zinc aluminium oxide, a mixed antimony tin oxide, and a mixed titanium zinc oxide,
wherein the interlayer provides contact between a first surface of the inner sheet of glass and a second surface of the outer sheet of glass,
providing for a light source capable of projecting p-polarized light, and
arranging the light source to project the p-polarized light towards the glazing at an incidence angle of 42 to 72°,
wherein the first coating has p-polarized light reflection ≥7% and a total reflectance remaining ≤21%, and
wherein the glazing comprising the first coating has been heated to at least 560° C. for three or more minutes.

19. The method according to claim 18, wherein the first coating is deposited on the second sheet of glass by a method selected from the group consisting of: CVD, PECVD, PVD, magnetron sputtering, and wet coating.

20. The method according to claim 18, wherein the at least one low refractive index layer has a thickness from 70 to 160 nm, and the first coating is deposited on the second sheet of glass by a PECVD method.

21. The HUD system according to claim 18, wherein the at least one high refractive index layer comprises at least one of: a mixed titanium zirconium oxide, a mixed titanium silicon oxide, a mixed niobium zirconium oxide, an aluminium doped silicon nitride, a zirconium oxide, a mixed indium tin oxide, a mixed zinc aluminium mixed oxide, a mixed antimony tin mixed oxide, a mixed titanium zinc oxide, and a mixed zinc tin oxide.

22. A HUD system comprising:
a light source projecting a p-polarized light towards a glazing,
the glazing comprising an outer sheet of glass having a first surface and a second surface, and an inner sheet of glass having a first surface and a second surface,
wherein the second surface of the inner sheet of glass comprises a first coating, the outer sheet of glass and inner sheet of glass bonded by at least one sheet of interlayer material providing contact between the first surface of the inner sheet of glass and the second surface of the outer sheet of glass,
wherein the first coating comprises:
at least one high refractive index layer having a thickness from 50 to 100 nm, and
at least one low refractive index layer having a thickness from 70 to 160 nm, and
wherein the least one high refractive index layer comprises at least one of:
an oxide of Zr, Nb, Sn;
a mixed oxide of Ti, Zr, Nb, Si, Sb, Sn, Zn, In;
a nitride of Si, Zr; and
a mixed nitride of Si, Zr, and
a second coating comprising n IR reflective functional layer based layers and an n+1 dielectric layers, wherein each IR reflective functional layer based layer is located between two dielectric layers on at least one of the first surface of the inner sheet of glass or the second surface of the outer sheet of glass, and
wherein the second coating comprises the following sequential layers:
a base dielectric layer comprising a base dielectric lower layer and a base dielectric upper layer which is of a different composition to that of the base dielectric lower layer, the base dielectric upper layer comprising either one of zinc oxide or a mixed oxide of Zn and at least one additional material X, in which a ratio X/Zn in the base dielectric upper layer is between 0.02 and 0.5 by weight and in which X is one or more of the materials selected from the group comprising Sn, Al, Ga, In, Zr, Sb, Bi, Mg, Nb, Ta and Ti,
a first infra-red reflecting layer,
a first barrier layer,
a central dielectric layer comprising a central dielectric lower layer and a central dielectric upper layer which is of a different composition to that of the central dielectric lower layer, the central dielectric lower layer being in direct contact with the first barrier layer and the central dielectric upper layer; the central dielectric upper layer comprising either one of zinc oxide or a mixed oxide of Zn and at least one additional material Y, in which a ratio Y/Zn in the base dielectric upper layer is between 0.02 and 0.5 by weight and in which Y is one or more of the materials selected from the group comprising Sn, Al, Ga, In, Zr, Sb, Bi, Mg, Nb, Ta and Ti,
a second infra-red reflecting layer,
a second barrier layer, and
a top dielectric layer.

* * * * *